(12) United States Patent
Tan et al.

(10) Patent No.: US 10,493,674 B2
(45) Date of Patent: Dec. 3, 2019

(54) FLUID CHANNEL FLOW DISRUPTION

(71) Applicant: Synventive Molding Solutions, Inc., Peabody, MA (US)

(72) Inventors: Zhuang Rui Tan, Evanston, IL (US); Salvatore A. LoGrasso, Beverly, MA (US); Albert R. Bernier, Gloucester, MA (US); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 203 days.

(21) Appl. No.: 14/882,927

(22) Filed: Oct. 14, 2015

(65) Prior Publication Data

US 2017/0100863 A1 Apr. 13, 2017

Related U.S. Application Data

(63) Continuation of application No. PCT/US2015/054409, filed on Oct. 7, 2015.

(51) Int. Cl.
*B29C 45/00* (2006.01)
*B29C 45/03* (2006.01)
(Continued)

(52) U.S. Cl.
CPC .......... *B29C 45/0046* (2013.01); *B29C 45/03* (2013.01); *B29C 45/231* (2013.01);
(Continued)

(58) Field of Classification Search
CPC .. B29C 2045/1794; B29C 2945/76568; B29C 2945/76755; B29C 2945/76859;
(Continued)

(56) References Cited

U.S. PATENT DOCUMENTS

| 3,050,779 A | * | 8/1962 | Farley | B29C 45/231 |
| | | | | 126/343.5 A |
| 4,268,240 A | * | 5/1981 | Rees | B29C 45/281 |
| | | | | 425/548 |

(Continued)

FOREIGN PATENT DOCUMENTS

| DE | 19949850.4 A1 | 12/2000 |
| EP | 0614744 A1 | 9/1994 |

(Continued)

OTHER PUBLICATIONS

Int'l. Search Report and Written Opinion dated Dec. 11, 2014 in Int'l. Appln. No. PCT/US14/52639.

(Continued)

*Primary Examiner* — Xiao S Zhao
*Assistant Examiner* — Emmanuel S Luk
(74) *Attorney, Agent, or Firm* — Polsinelli, PC

(57) ABSTRACT

An injection molding apparatus including an actuator interconnected to a rod or valve pin having a smooth continuous cylindrical outer surface and one or more discontinuous or relieved or relieved portions formed as discontinuities in the cylindrical outer surface and adapted to be disposed within a fluid flow channel, the one or more discontinuous or relieved portions being configured and arranged along the axial length of the pin or rod such that the flow of injection fluid over or past the one or more discontinuous or relieved portions is modified to flow at substantially different rates or velocities or in substantially different flow patterns relative to rate or velocity or pattern of flow of injection fluid over or past the smooth continuous cylindrical outer surface.

6 Claims, 25 Drawing Sheets

(51) Int. Cl.
 B29C 45/76 (2006.01)
 B29C 45/23 (2006.01)
 B29C 45/28 (2006.01)
 B29C 45/17 (2006.01)
(52) U.S. Cl.
 CPC ........ B29C 45/281 (2013.01); B29C 45/7613 (2013.01); *B29C 2045/1794* (2013.01); *B29C 2945/76568* (2013.01); *B29C 2945/76755* (2013.01); *B29C 2945/76859* (2013.01)
(58) Field of Classification Search
 CPC . B29C 45/0046; B29C 45/231; B29C 45/281; B29C 45/7613; B29C 2045/2882; B29C 2045/308; B29C 45/03; B29C 45/30; B29C 45/76
 See application file for complete search history.

(56) References Cited

U.S. PATENT DOCUMENTS

| | | | |
|---|---|---|---|
| 4,450,999 A | 5/1984 | Gellert | |
| 4,965,028 A * | 10/1990 | Maus | B01D 29/44 264/297.2 |
| 5,164,200 A * | 11/1992 | Johnson | B29C 45/1735 264/572 |
| 5,783,234 A * | 7/1998 | Teng | B29C 45/2806 425/549 |
| 5,891,381 A * | 4/1999 | Bemis | B29C 45/1603 264/328.8 |
| 6,382,528 B1 | 5/2002 | Bouti | |
| 6,679,697 B2 * | 1/2004 | Bouti | B29C 45/2806 425/130 |
| 6,752,618 B2 * | 6/2004 | Dewar | B29C 45/2806 425/564 |
| 6,974,556 B2 * | 12/2005 | Bemis | B29C 45/1603 264/328.12 |
| 7,581,944 B2 * | 9/2009 | Fairy | B29C 45/2806 425/564 |
| 7,753,676 B2 * | 7/2010 | Babin | B29C 45/2806 264/328.9 |
| 2001/0022321 A1 * | 9/2001 | Bouti | B29C 45/1603 239/13 |
| 2006/0088619 A1 * | 4/2006 | Spuller | B29C 45/2806 425/149 |
| 2006/0153945 A1 * | 7/2006 | Blais | B29C 45/2806 425/568 |
| 2007/0077328 A1 | 4/2007 | Olaru | |
| 2007/0292557 A1 * | 12/2007 | Dewar | B29C 45/2703 425/564 |
| 2008/0152751 A1 * | 6/2008 | Fairy | B29C 45/1603 425/549 |
| 2008/0317896 A1 | 12/2008 | Boxwala et al. | |
| 2009/0028986 A1 * | 1/2009 | Vasapoli | B29C 45/2701 425/563 |
| 2009/0061042 A1 * | 3/2009 | Fairy | B29C 45/2806 425/564 |
| 2009/0110765 A1 | 4/2009 | Mohammed | |
| 2010/0159062 A1 | 6/2010 | Klobucar et al. | |
| 2010/0209547 A1 * | 8/2010 | Heissler | B29C 45/2806 425/563 |
| 2013/0029067 A1 * | 1/2013 | Dircx | B29C 49/06 428/35.7 |
| 2014/0272283 A1 * | 9/2014 | Swenson | B29C 45/231 428/137 |
| 2016/0136854 A1 * | 5/2016 | Galati | B29C 45/281 264/328.12 |

FOREIGN PATENT DOCUMENTS

| | | |
|---|---|---|
| EP | 1658169 | 5/2006 |
| EP | 1997603 A1 | 3/2018 |
| JP | 55135635 | 10/1980 |
| JP | 02178012 | 11/1990 |
| JP | H09262872 A | 10/1997 |
| JP | H11254490 A | 9/1999 |

OTHER PUBLICATIONS

Written Opinion dated Jul. 21, 2015 in Int'l. Appln. No. PCT/US14/52639.
Int'l. Search Report and Written Opinion dated Aug. 8, 2016 International Application No. PCT/US2015/054409.
International Preliminary Report on Patentability dated Apr. 19, 2018.

* cited by examiner

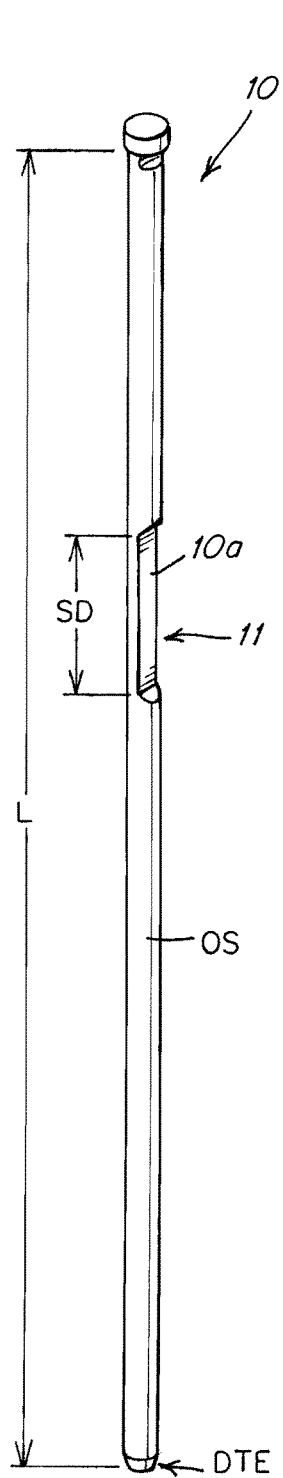
Fig. 1A
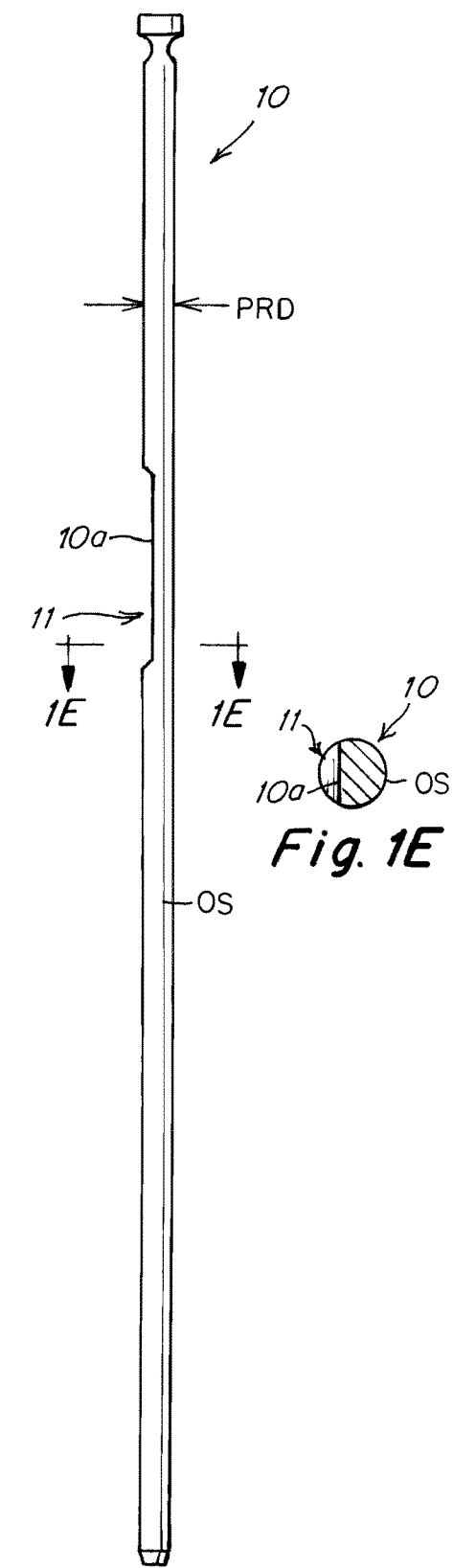
Fig. 1B
Fig. 1E

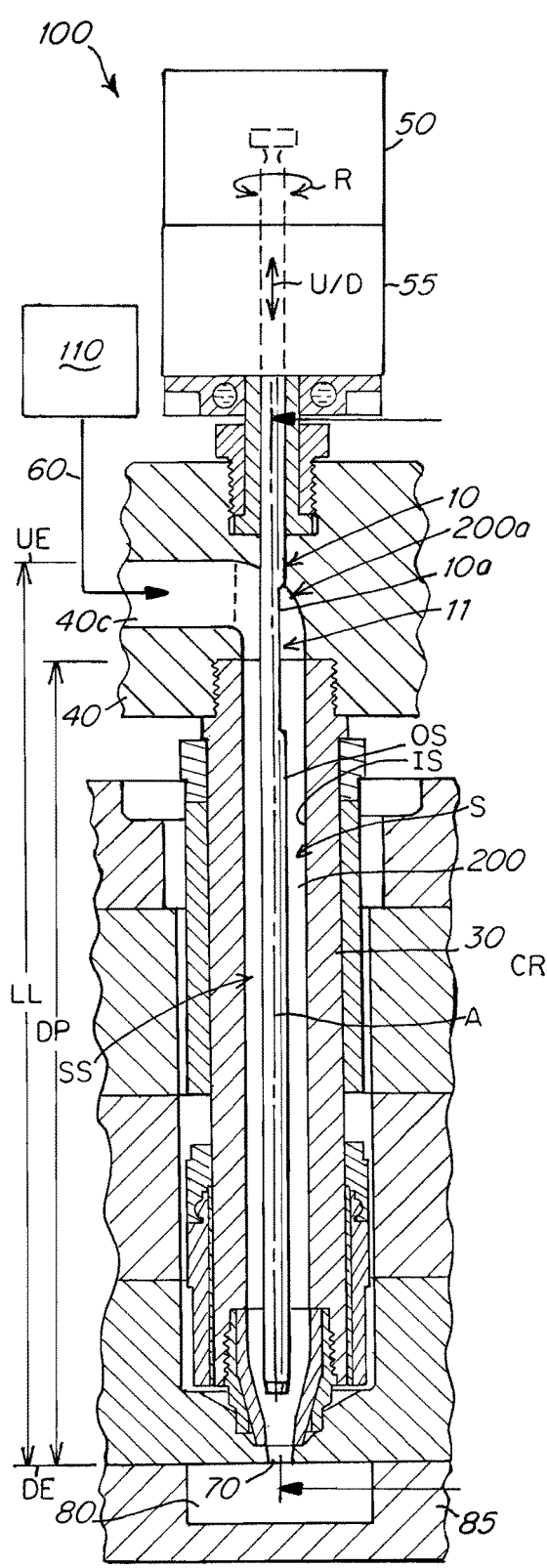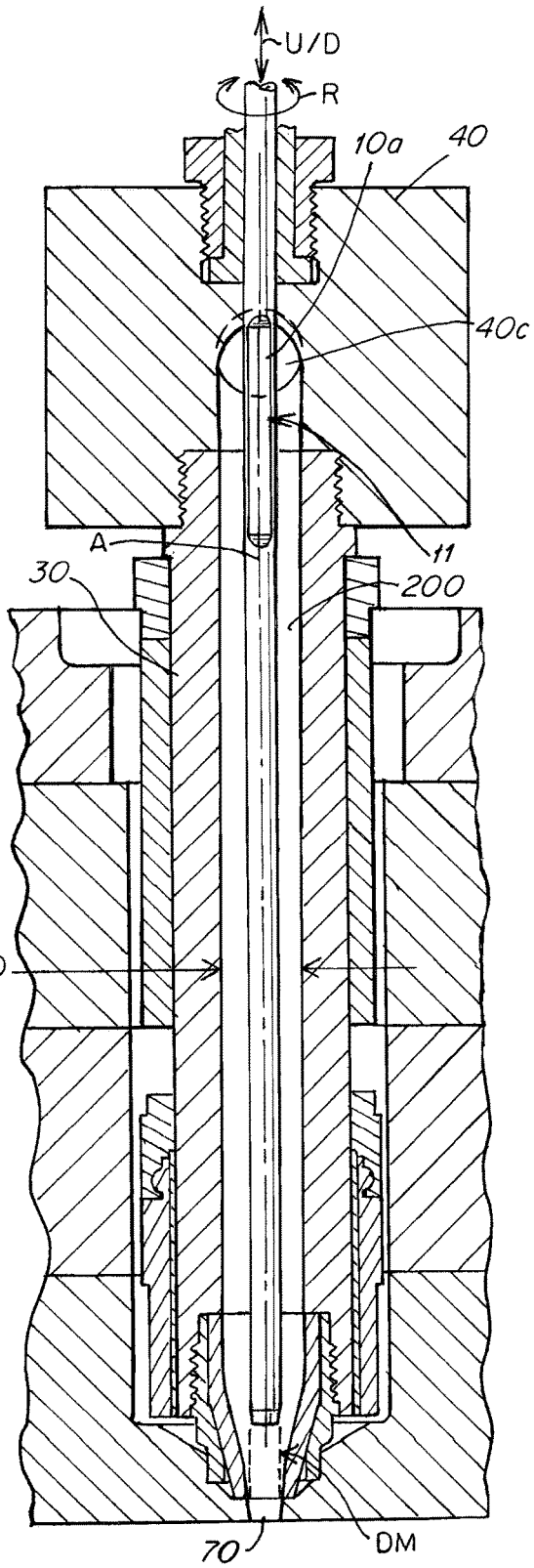
Fig. 1C
Fig. 1D

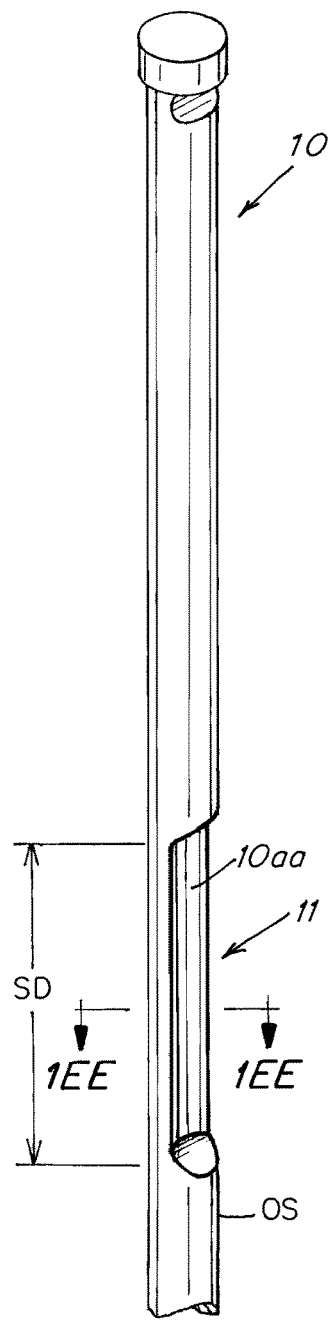 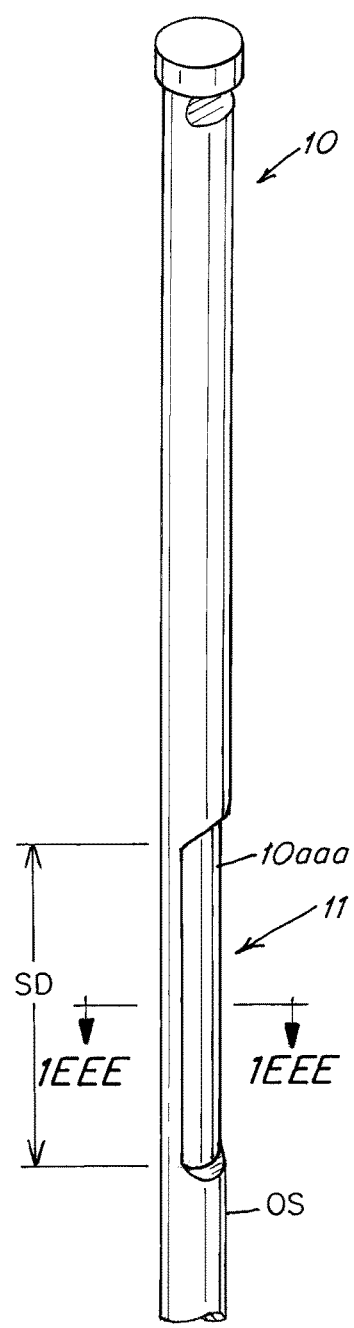
Fig.1AA    Fig.1AAA
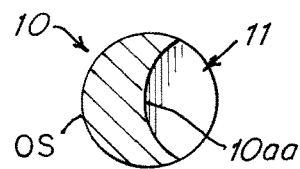 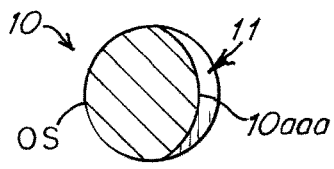
Fig. 1EE    Fig. 1EEE

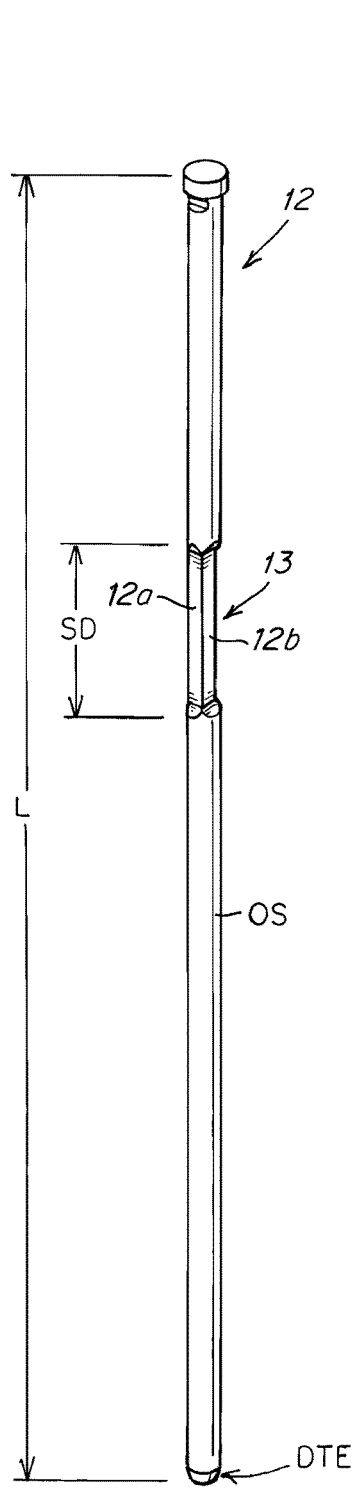
Fig. 2A
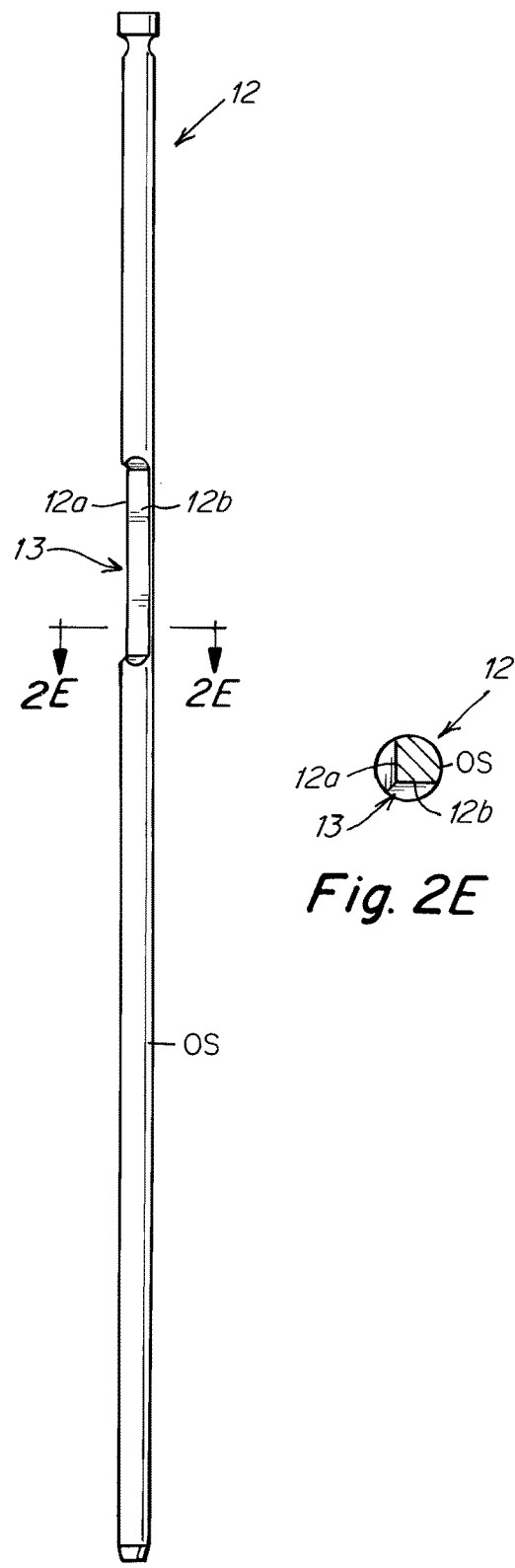
Fig. 2E
Fig. 2B

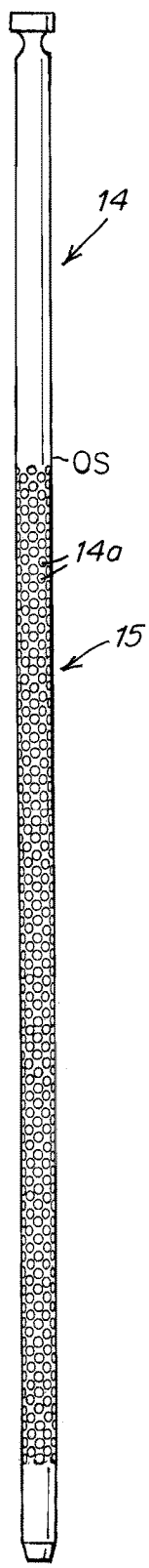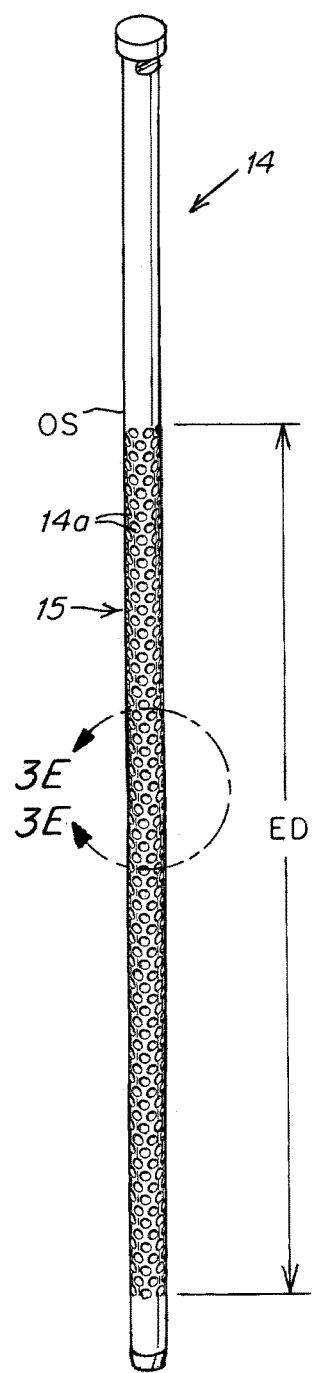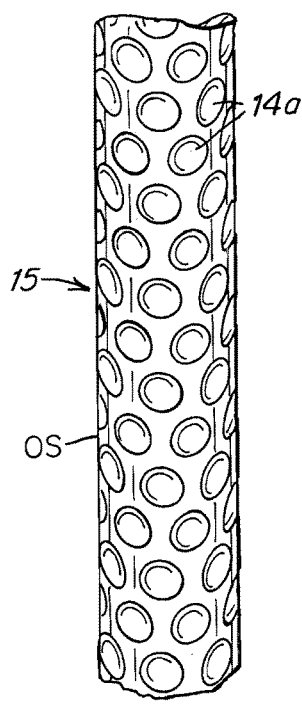
Fig. 3A
Fig. 3B
Fig. 3E

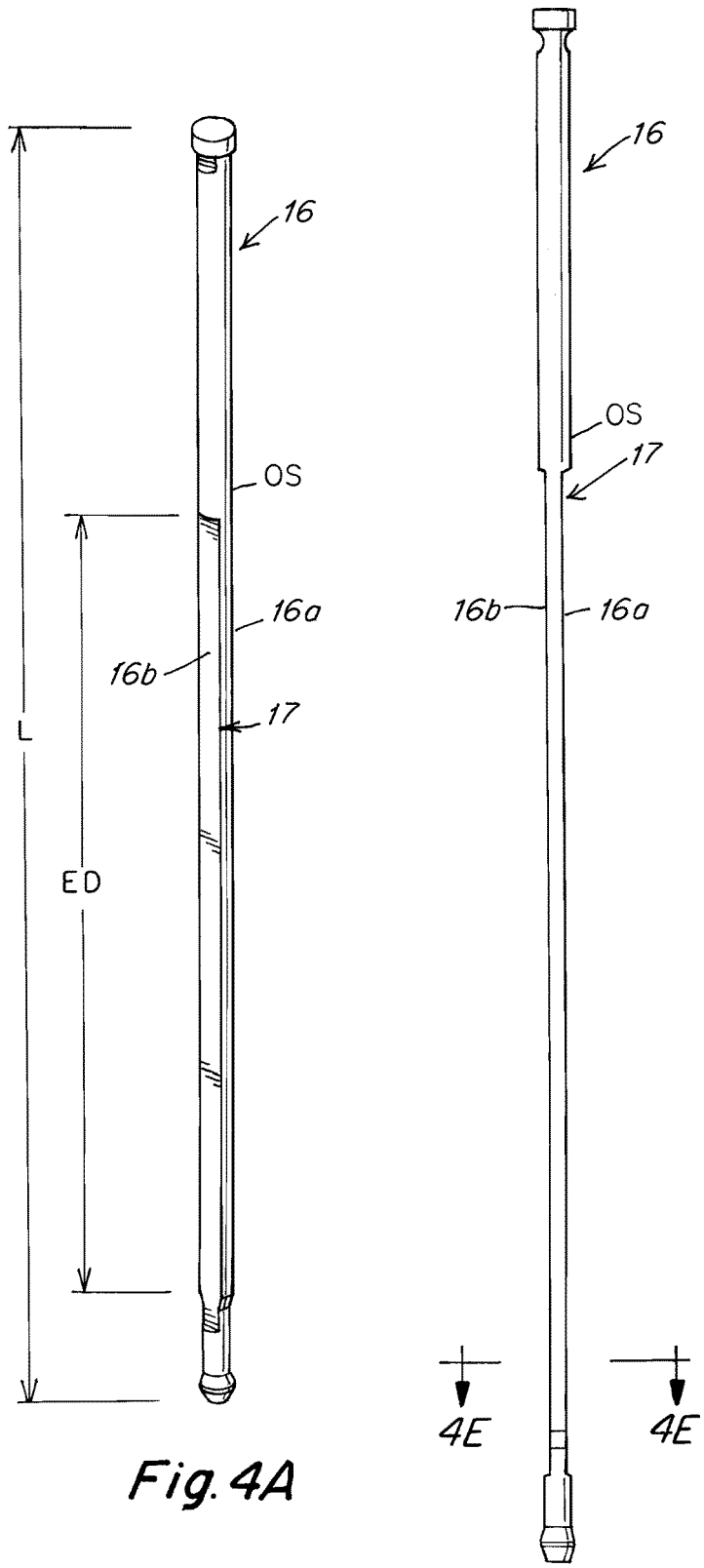
Fig. 4A
Fig. 4B
Fig. 4E

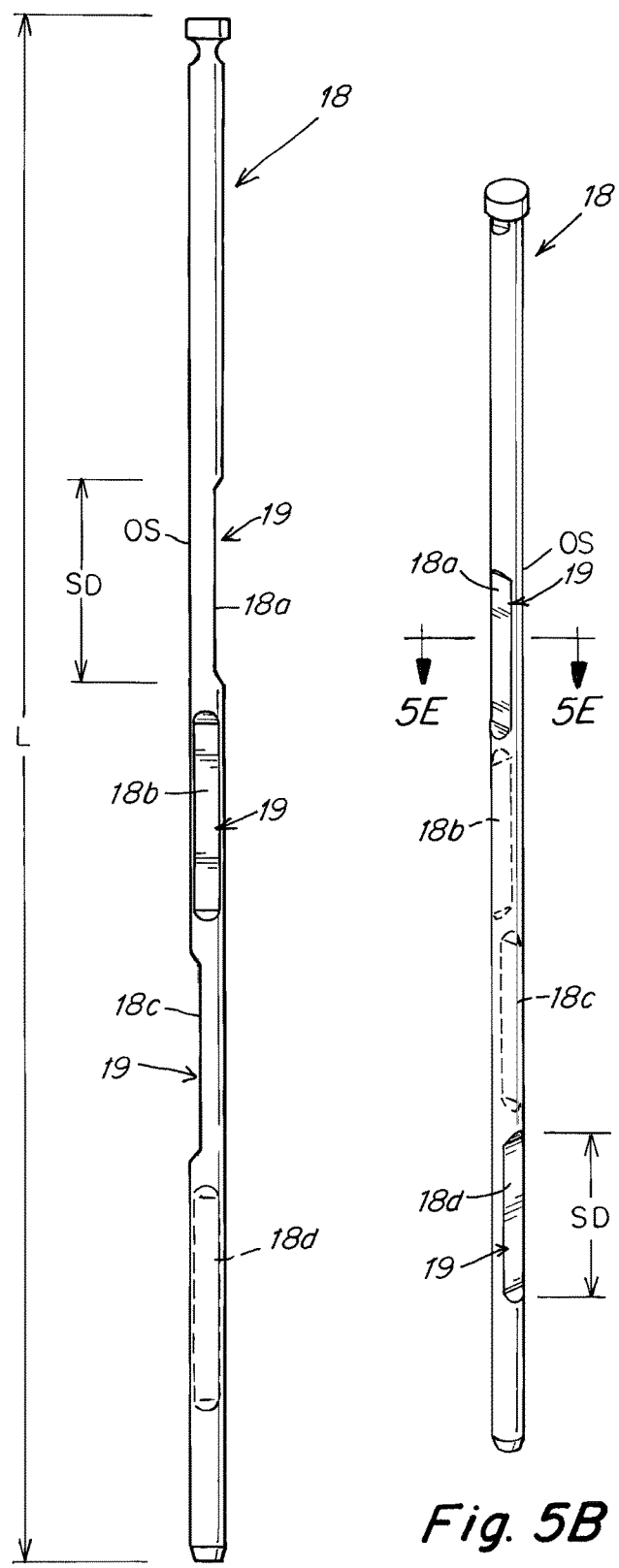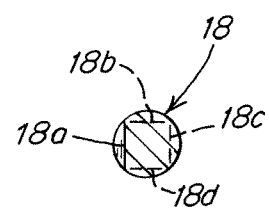
Fig. 5A  Fig. 5B  Fig. 5E

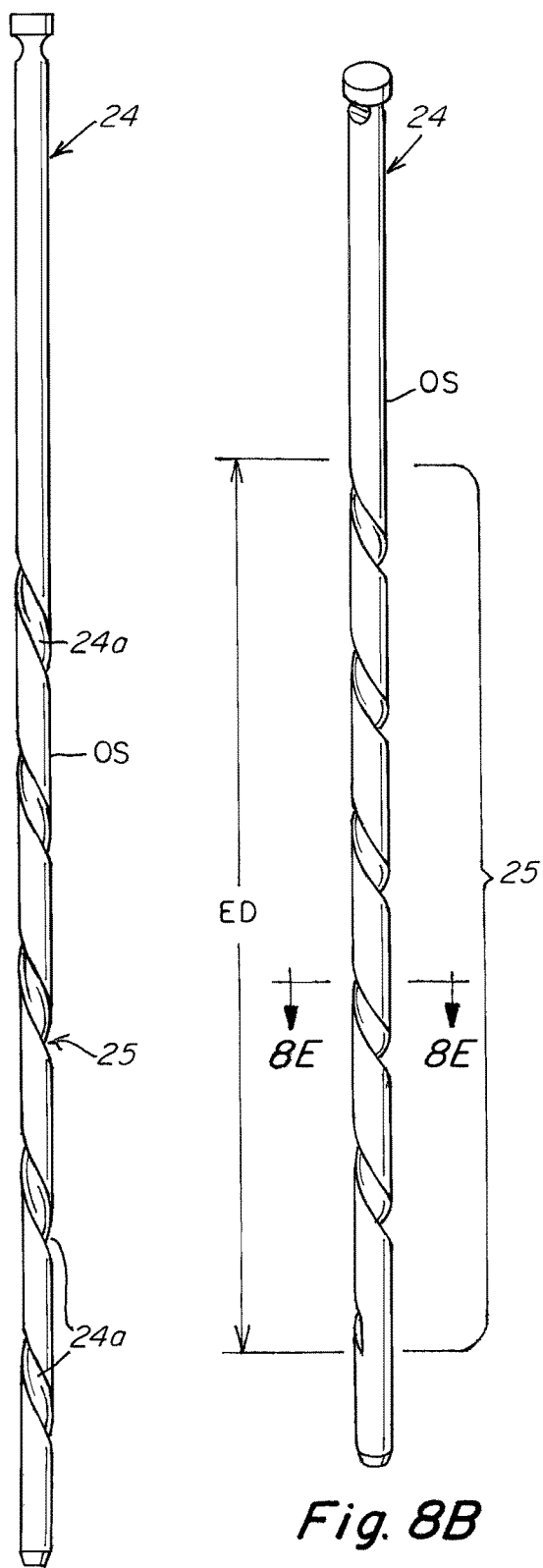

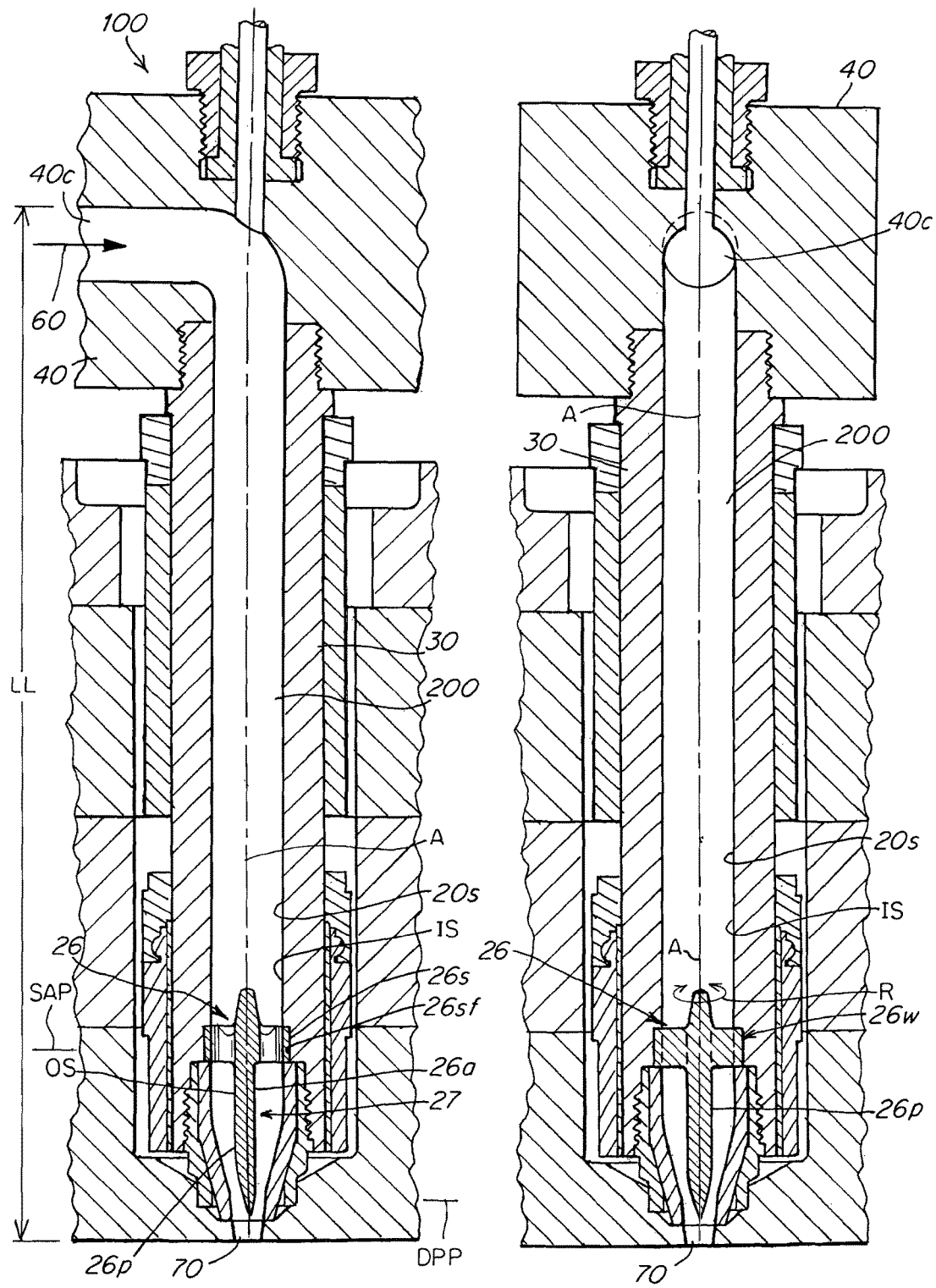
*Fig. 9C*   *Fig. 9D*

FLUID CHANNEL FLOW DISRUPTION

RELATED APPLICATIONS

This application is a continuation of and claims the benefit of priority to International application serial no. PCT/US15/054409 filed Oct. 7, 2015, the disclosure of which is incorporated by reference in its entirety as if fully set forth herein.

This application is a continuation-in-part of and claims the benefit of priority to International application serial no. PCT/US14/52639 filed Aug. 26, 2014, the disclosure of which is incorporated by reference in its entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), 6,419,870, 6,464,909 (7031), 6,599,116, 7,234,929 (7075US1), 7,419,625 (7075US2), U.S. Pat. No. 7,569,169 (7075US3), U.S. patent application Ser. No. 10/214,118, filed Aug. 8, 2002 (7006), U.S. Pat. Nos. 7,029,268 (7077US1), 7,270,537 (7077US2), 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and international applications PCT/US2011/062099 and PCT/US2011/062096.

BACKGROUND OF THE INVENTION

Injection molding systems having valve pins or stems disposed within flow channels have been used where the pins have cylindrical configurations or outer circumferential or perimeter surface configurations that are uniform in diameter or contour along the axial length of the pin or stem.

SUMMARY OF THE INVENTION

In accordance with the invention there is provided an injection molding apparatus comprising an injection molding machine, a manifold that receives injection fluid from the machine and routes the injection fluid from an upstream end toward a downstream end of a fluid flow channel disposed in the manifold or a nozzle communicating with the manifold, the fluid flow channel having a flow axis and a channel length, the fluid flow channel communicating at the downstream end with a gate to a cavity of a mold, the apparatus including a rod or pin that extends axially through at least a portion of the channel length of the fluid flow channel, the rod or pin having an outer circumferential surface that is discontinuous in contour or profile relative to a smooth cylindrical circumferential surface such that injection fluid that flows over or past the discontinuous circumferential surface of the rod or pin is forced to flows in a discontinuous or disrupted flow path relative to a flow path over or past a smooth cylindrical circumferential surface.

The pin or rod has a maximum radial diameter that is less than the minimum radial diameter of the fluid flow channel in which the pin or rod is disposed such that a flow space is disposed between the discontinuous outer circumferential surface of the pin or rod and the interior surface of the flow channel in which the pin or rod is disposed.

The discontinuous circumferential surface can comprise a flat surface that is formed along a selected axial length of an otherwise smooth cylindrically outer surfaced rod or pin.

The discontinuous circumferential surface can comprise multiple flat surfaces that are formed along multiple selected axial lengths of an otherwise smooth cylindrically outer surfaced rod or pin.

The discontinuous circumferential surface can comprise multiple flat surfaces that are formed at one or more radially different orientations along one or more multiple selected axial lengths of an otherwise smooth cylindrically outer surfaced rod or pin.

The discontinuous circumferential surface can comprise a spiral groove formed along one or more selected axial lengths within the otherwise smooth cylindrically outer surfaced rod or pin.

The discontinuous circumferential surface can comprise one or more grooves formed as one or more reduced diameter cylindrical portions along one or more selected axial lengths of an otherwise smooth larger diameter cylindrically outer surfaced rod or pin.

The discontinuous circumferential surface can comprise multiple curvilinear surfaces that are formed along multiple selected axial lengths of an otherwise smooth cylindrically outer surface rod or pin.

The discontinuous circumferential surface can comprise multiple non-smooth outer surfaced or non-uniform diameter sections that are formed along multiple selected axial lengths of an otherwise smooth cylindrically outer surface rod or pin.

The apparatus can include one or more actuators that drive the rod or pin reciprocally upstream and downstream along and through the axis of the fluid flow channel or that rotatably drive the rod or pin around an axis of the rod or pin while the rod or pin is disposed in the fluid flow channel and fluid is being injected through the flow channel from the upstream end to the downstream end.

In another aspect of the invention there is provided a method of injecting a selected injection fluid into a cavity of a mold comprising injecting the selected injection from an injection molding machine into a manifold of an injection system comprised of an injection molding apparatus that is comprised of the injection molding machine, the manifold wherein the manifold receives injection fluid from the injection molding machine and routes the injection fluid from an upstream end toward a downstream end of a fluid flow channel disposed in the manifold or in a nozzle that communicates with the manifold, the fluid flow channel having a flow axis and a channel length, the fluid flow channel communicating at the downstream end with a gate to the cavity of the mold, the apparatus including a rod or pin that extends axially through at least a portion of the channel length of the fluid flow channel, the rod or pin having an outer circumferential surface that is discontinuous in contour or profile relative to a smooth cylindrical circumferential surface such that injection fluid that flows over or past the discontinuous circumferential surface of the rod or pin is forced to flows in a discontinuous or disrupted flow path relative to a flow path over or past a smooth cylindrical circumferential surface.

In another aspect of the invention there is provided an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL) and having a generally straight channel section (SS) extending a downstream portion (DP) of the channel length (LL) along which the injection fluid (60) flows from the distribution channel (40c) through the channel (200) to a gate (70) to a mold cavity (80), the fluid flow channel (200) mating at the downstream end (DE) with the gate (70) to the cavity (80), the apparatus (100) including an actuator (55) interconnected to a rod or pin (10, 12, 16, 18, 22, 120) having an axis (A) having an axial length (L), the actuator (55) and the rod or pin being adapted to enable the pin or rod to be mounted such that that the rod or pin is disposed and drivable by the actuator reciprocally through a path of upstream downstream (UD) travel within the fluid flow channel (200) wherein the pin or rod is drivable to a downstream-most position (DM) where a distal tip end (DTE) of the pin or rod closes the gate (70) off from flow of injection fluid (60) through the gate (70), the rod or pin having a smooth continuous cylindrical outer surface (OS), the rod or pin including one or more discontinuous or relieved or relieved portions (10a, 12a, 12b, 16a, 16b, 18a, 18b, 18c, 22a) formed as discontinuities in the cylindrical outer surface, the one or more discontinuous or relieved portions extending axially along one or more selected portions (SD, ED) of the axial length (L) of the rod or pin, the actuator (55) and the rod or pin being adapted to mount the rod or pin (10, 12, 16, 18, 22, 120) such that the rod or pin is prevented from rotating around the axis (A) of the rod or pin, the actuator and the rod or pin being adapted to mount the rod or pin such that the one or more discontinuous or relieved portions (10a, 12a, 12b, 16a, 16b, 18a, 18b, 18c, 22a) are disposed within the fluid flow channel (200), the one or more discontinuous or relieved portions (10a, 12a, 12b, 16a, 16b, 18a, 18b, 18c, 22a) being configured and arranged along the axial length (L) of the pin or rod such that the flow of injection fluid over or past the one or more discontinuous or relieved portions disposed in the straight section (SS) is modified to flow at substantially different rates or velocities or in substantially different flow patterns relative to rate or velocity or pattern of flow of injection fluid over or past the smooth continuous cylindrical outer suface (OS).

In such an apparatus the one or more discontinuous or relieved portions can be formed into the smooth cylindrical outer surface (OS) in a configuration having a generally flat, planar concave or convex surface (10a, 12a, 12b, 16a, 16b, 18a, 18b, 18c, 22a).

The fluid flow channel (200) can include a curved or arcuate portion (200a) communicating flow of the injection fluid (60) from the distribution channel (40c) through and along the channel length (LL) of the fluid flow channel (200) to the gate (70), the actuator and the rod or pin being adapted to mount the rod or pin such that a discontinuous or relieved portion (10a, 12a, 12b, 16a, 16b, 18a, 18b, 18c, 22a) of the rod or pin is disposed within the curved or arcuate portion (200a) of the fluid flow channel (200) over the course of at least a portion of the reciprocal upstream downstream (UD) path of travel of the valve pin.

The distribution channel (40c) has a second axis (AA) disposed at an angle (X) to the primary axis (A) of the fluid flow channel (200), the arcuate portion (200a) of the channel (200) routing injection fluid from the distribution channel (40c) through an arcuate or curved path over the discontinuous or relieved portion (10a, 12a, 12b, 14a, 16a, 16b, 18a, 20a, 22a, 24a) of the rod or pin disposed within the curved or arcuate portion (200a) over the course of at least a portion of the upstream downstream (UD) path of travel of the valve pin.

One or more of the discontinuous or relieved portions can have two or more generally flat, planar, concave or convex surfaces (12a, 12b, 16a, 16b) disposed at a non-planar angle relative to each other.

The two or more successive discontinuous or relieved portions can each have a generally flat, planar, concave or convex surface disposed at a non-planar angle relative to each other.

The discontinuous or relieved portions are preferably formed into the smooth continuous cylindrical outer surface as discontinuities comprising one or more of protrusions, grooves, spiral grooves, spiral grooves, spiral grooves, flats, concave surfaces, convex surfaces, dimples, projections, fins or apertures.

The fluid flow channel preferably has a minimum radial diameter and the pin or rod has a maximum radial diameter that is less than the minimum radial diameter of the fluid flow channel in which the pin or rod is disposed such that a flow space is disposed between the discontinuous or relieved portion of the outer circumferential surface of the pin or rod and an interior surface of the flow channel in which the pin or rod is disposed.

In another aspect of the invention there is provided a method of injecting fluid into a mold cavity (80) comprising injecting an injection fluid (60) into the fluid distribution channel (40c) and fluid flow channel (200) of an apparatus as described above and controllably operating the actuator (55) to enable the injection fluid (60) to be injected into the mold cavity (80)

In another aspect of the invention there is provided a method of injecting fluid into a mold cavity (80) of an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), wherein the fluid flow channel (200) has a channel length (LL) and has a generally straight channel section (SS) extending a downstream portion (DP) of the channel length (LL) along which the injection fluid (60) flows from the distribution channel (40c) through the fluid flow channel (200) to a gate (70) to the mold cavity (80), the fluid flow channel (200) mating at the downstream end (DE) with the gate (70) to the cavity (80), the apparatus (100) including an actuator (55) interconnected to a rod or pin (10, 12, 16, 18, 22, 120) having an axis (A) having an axial length (L), the actuator (55) and the rod or pin being adapted to enable the pin or rod to be mounted such that that the rod or pin is disposed and drivable by the actuator reciprocally through a path of upstream downstream (UD) travel within the fluid flow channel (200) wherein the pin or rod is drivable to a downstream-most position (DM) where a distal tip end (DTE) of the pin or rod closes the gate (70) off from flow of injection fluid (60) through the gate (70), the method comprising:

selecting a rod or pin having a smooth continuous cylindrical outer surface (OS) and one or more discontinuous or relieved portions (10a, 12a, 12b, 16a, 16b, 18a, 18b, 18c, 22a) formed as discontinuities in the cylindrical outer surface, the one or more discontinuous or relieved portions extending axially along one or more selected portions (SD, ED) of the axial length (L) of the rod or pin, mounting the rod or pin (10, 12, 16, 18, 22, 120) such that the rod or pin is prevented from rotating around the axis (A) of the rod or pin, mounting the rod or pin such that the one or more discontinuous or relieved portions (10a, 12a, 12b, 16a, 16b, 18a, 18b, 18c, 22a) are disposed within the fluid flow channel (200), injecting injection fluid (60) from the fluid distribution channel (40c) to flow through the fluid flow channel (200), wherein the one or more discontinuous or relieved portions (10a, 12a, 12b, 16a, 16b, 18a, 18b, 18c, 22a) are configured and arranged along the axial length (L) of the pin or rod such that the flow of injection fluid over or past the one or more discontinuous or relieved portions disposed in the straight section (SS) is modified to flow at substantially different rates or velocities or in substantially different flow patterns relative to rate or velocity or pattern of flow of injection fluid over or past the smooth continuous cylindrical outer suface (OS).

In such a method the fluid flow channel (200) can include a curved or arcuate portion (200a) communicating flow of the injection fluid (60) from the distribution channel (40c) through and along the channel length (LL) of the fluid flow channel (200) to the gate (70), the actuator and the rod or pin being adapted to mount the rod or pin such that a discontinuous or relieved portion (10a, 12a, 12b, 16a, 16b, 18a, 18b, 18c, 22a) of the rod or pin is disposed within the curved or arcuate portion (200a) of the fluid flow channel (200) over the course of at least a portion of the reciprocal upstream downstream (UD) path of travel of the valve pin.

In such a method the distribution channel (40c) typically has a second axis (AA) disposed at an angle (X) to the primary axis (A) of the fluid flow channel (200), the arcuate portion (200a) of the fluid flow channel (200) routing injection fluid from the distribution channel (40c) through an arcuate or curved path over the discontinuous or relieved portion (10a, 12a, 12b, 14a, 16a, 16b, 18a, 20a, 22a, 24a) of the rod or pin disposed within the curved or arcuate portion (200a) over the course of at least a portion of the upstream downstream (UD) path of travel of the valve pin.

In another aspect of the invention there is provided an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL) and having a generally straight channel section (SS) extending a downstream portion (DP) of the channel length (LL) along which the injection fluid (60) flows from the distribution channel (40c) through the fluid flow channel (200) to a gate (70) to a mold cavity (80), the fluid flow channel (200) mating at the downstream end (DE) with the gate (70) to the cavity (80), the apparatus (100) including an actuator (55) interconnected to a rod or pin (10, 12, 16, 18, 22, 120) having an axis (A) having an axial length (L), the actuator (55) and the rod or pin being adapted to mount the pin or rod such that that the rod or pin is disposed and drivable by the actuator reciprocally through a path of upstream downstream (UD) travel within the fluid flow channel (200) wherein a distal tip end (DTE) of the pin or rod closes the gate (70) off from flow of injection fluid (60) through the gate (70) when the pin or rod is driven to a downstream-most position (DM), the rod or pin having a smooth continuous cylindrical outer surface (OS), the rod or pin including one or more discontinuous or relieved portions (10a, 12a, 12b, 16a, 16b, 18a, 18b, 18c, 22a) formed as discontinuities in the cylindrical outer surface (OS), the one or more discontinuous or relieved portions extending axially along one or more selected portions (SD, ED) of the axial length (L) of the rod or pin, the one or more discontinuous or relieved portions being formed into the smooth cylindrical outer surface (OS) in a configuration having a generally flat, planar, concave or convex surface (10a, 10aa, 10aaa, 12a, 12b, 16a, 16b, 18a, 18b, 18c, 22a), the actuator (55) and the rod or pin being adapted to mount the rod or pin (10, 12, 16, 18, 22, 120) such that the rod or pin is prevented from rotating around the axis (A) of the rod or pin within the fluid flow channel (200), the actuator and the rod or pin being adapted to mount the rod or pin such that the generally flat surfaces of the one or more discontinuous or relieved portions (10a, 12a, 12b, 16a, 16b, 18a, 18b, 18c, 22a) are disposed within the fluid flow channel (200), the one or more generally flat, planar, concave or convex surfaces of the discontinuous or relieved portions (10a, 10aa, 10aaa, 12a, 12b, 16a, 16b, 18a, 18b, 18c, 22a) being arranged along the axial length (L) of the pin or rod such that the flow of injection fluid over or past the one or more discontinuous or relieved portions disposed within the straight section (SS) is modified to flow at substantially different rates or velocities or in substantially different flow patterns relative to rate or velocity or pattern of flow of injection fluid over or past the smooth continuous cylindrical outer suface (OS).

In such an apparatus the fluid flow channel (200) can include a curved or arcuate portion (200a) communicating flow of the injection fluid (60) from the distribution channel (40c) through and along the channel length (LL) of the fluid flow channel (200) to the gate (70), the actuator and the rod or pin being adapted to mount the rod or pin such that a discontinuous or relieved portion (10a, 12a, 12b, 16a, 16b, 18a, 18b, 18c, 22a) of the rod or pin is disposed within the curved or arcuate portion (200a) of the fluid flow channel (200) over the course of at least a portion of the reciprocal upstream downstream (UD) path of travel of the valve pin.

The distribution channel (40c) can have a second axis (AA) disposed at an angle (X) to the primary axis (A) of the fluid flow channel (200), the arcuate portion (200a) of the fluid flow channel (200) routing injection fluid from the distribution channel (40c) through an arcuate or curved path over the discontinuous or relieved portion (10a, 12a, 12b, 14a, 16a, 16b, 18a, 20a, 22a, 24a) of the rod or pin disposed within the curved or arcuate portion (200a) over the course of at least a portion of the upstream downstream (UD) path of travel of the valve pin.

One or more of the discontinuous or relieved portions can have two or more generally flat, planar, concave or convex surfaces (12a, 12b, 16a, 16b) disposed at a non-planar angle relative to each other.

The two or more successive discontinuous or relieved portions can each have a generally flat, planar, concave or convex surface disposed at a non-planar angle relative to each other.

The fluid flow channel typically has a minimum radial diameter and the pin or rod has a maximum radial diameter that is less than the minimum radial diameter of the fluid flow channel in which the pin or rod is disposed such that a flow space is disposed between the discontinuous or relieved portion of the outer circumferential surface of the pin or rod and an interior surface of the flow channel in which the pin or rod is disposed.

In another aspect of the invention there is provided a method of injecting fluid into a mold cavity (80) comprising injecting an injection fluid (60) into the fluid distribution channel (40c) and fluid flow channel (200) of an apparatus as described above and controllably operating the actuator (55) to enable the injection fluid (60) to be injected into the mold cavity (80).

In another aspect of the invention there is provided a method of injecting fluid into a mold cavity (80) of an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), wherein the fluid flow channel (200) has a channel length (LL) and has a generally straight channel section (SS) extending a downstream portion (DP) of the channel length (LL) along which the injection fluid (60) flows from the distribution channel (40c) through the fluid flow channel (200) to a gate (70) to the mold cavity (80), the fluid flow channel (200) mating at the downstream end (DE) with the gate (70) to the cavity (80), the apparatus (100) including an actuator (55) interconnected to a rod or pin (10, 12, 16, 18, 22, 120) having an axis (A) having an axial length (L), the actuator (55) and the rod or pin being adapted to enable the pin or rod to be mounted such that that the rod or pin is disposed and drivable by the actuator reciprocally through a path of upstream downstream (UD) travel within the fluid flow channel (200) wherein the pin or rod is drivable to a downstream-most position (DM) where a distal tip end (DTE) of the pin or rod closes the gate (70) off from flow of injection fluid (60) through the gate (70), the method comprising:

selecting a rod or pin having a smooth continuous cylindrical outer surface (OS) and one or more discontinuous or relieved portions (10a, 10aa, 10aaa, 12a, 12b, 16a, 16b, 18a, 18b, 18c, 22a) formed as generally flat, planar, concave or convex surfaces in the cylindrical outer surface, the one or more discontinuous or relieved portions extending axially along one or more selected portions (SD, ED) of the axial length (L) of the rod or pin, mounting the rod or pin (10, 12, 16, 18, 22, 120) such that the rod or pin is prevented from rotating around the axis (A) of the rod or pin, mounting the rod or pin such that the one or more discontinuous or relieved portions (10a, 12a, 12b, 16a, 16b, 18a, 18b, 18c, 22a) are disposed within the fluid flow channel (200), injecting injection fluid (60) from the fluid distribution channel (40c) to flow through the fluid flow channel (200), wherein the one or more discontinuous or relieved portions having discontinuities formed as generally flat, planar, concave or convex surfaces (10a, 10aa, 10aaa, 12a, 12b, 16a, 16b, 18a, 18b, 18c, 22a) are arranged along the axial length (L) of the pin or rod such that the flow of injection fluid over or past the one or more discontinuous or relieved portions disposed in the straight section (SS) is modified to flow at substantially different rates or velocities or in substantially different flow patterns relative to rate or velocity or pattern of flow of injection fluid over or past the smooth continuous cylindrical outer suface (OS).

In such a method the fluid flow channel (200) can includes a curved or arcuate portion (200a) communicating flow of the injection fluid (60) from the distribution channel (40c) through and along the channel length (LL) of the fluid flow channel (200) to the gate (70), the actuator and the rod or pin being adapted to mount the rod or pin such that a discontinuous or relieved portion (10a, 12a, 12b, 16a, 16b, 18a, 18b, 18c, 22a) of the rod or pin is disposed within the curved or arcuate portion (200a) of the fluid flow channel (200) over the course of at least a portion of the reciprocal upstream downstream (UD) path of travel of the valve pin.

In such a method the distribution channel (40c) can have a second axis (AA) disposed at an angle (X) to the primary axis (A) of the fluid flow channel (200), the arcuate portion (200a) of the fluid flow channel (200) routing injection fluid from the distribution channel (40c) through an arcuate or curved path over the discontinuous or relieved portion (10a, 12a, 12b, 14a, 16a, 16b, 18a, 20a, 22a, 24a) of the rod or pin disposed within the curved or arcuate portion (200a) over the course of at least a portion of the upstream downstream (UD) path of travel of the valve pin.

In another aspect of the invention there is provided an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL), a primary axis (A) of flow and a curved or arcuate portion (200a) communicating flow of the injection fluid (60) from the distribution channel (40c) through and along the primary axis (A) of the fluid flow channel (200) to a gate (70) to a mold cavity (80), the fluid flow channel (200) communicating at the downstream end (DE) with the gate (70) to the cavity (80), the apparatus (100) including an actuator (55) interconnected to a rod or pin (10, 12, 14, 16, 18, 20, 22, 24, 26, 120), the actuator (55) being adapted to dispose and drive the rod or pin reciprocally through a path of upstream downstream (UD) travel along the primary axis (A) of the fluid flow channel (200), the rod or pin having a smooth cylindrical outer surface (OS) adapted to enable the injection fluid to flow over the smooth cylindrical outer surface (OS) in a continuous non-turbulent stream of flow, the rod or pin including one or more discontinuous or relieved portions (10a, 12a, 12b, 14a, 16a, 16b, 18a, 20a, 22a, 24a) formed as discontinuities in the cylindrical outer surface (OS) including one or more of protrusions, grooves, spiral grooves, spiral grooves, spiral grooves, flats, concave surfaces, convex surfaces, dimples, projections, fins or apertures that extend along one or more selected portions (SD, ED) of the axial length (LL) of the fluid flow channel (200), the actuator (55), the fluid flow channel (200), the rod or pin being adapted such that at least one discontinuous or relieved portion (10*a*, 12*a*, 12*b*, 14*a*, 16*a*, 16*b*, 18*a*, 20*a*, 22*a*, 24*a*) of the rod or pin is disposed within the curved or arcuate portion (200*a*) of the fluid flow channel (200) over the course of at least a portion of the reciprocal upstream downstream (UD) path of travel of the valve pin, the one or more discontinuous or relieved portions (10*a*, 12*a*, 12*b*, 14*a*, 16*a*, 16*b*, 18*a*, 20*a*, 22*a*, 24*a*) being configured such that the flow of injection fluid over or past the one or more discontinuous or relieved portions disposed within the straight section (SS) is modified to flow at substantially different rates or velocities or in substantially different flow patterns relative to rate or velocity or pattern of flow of injection fluid over or past the smooth continuous cylindrical outer suface (OS).

The distribution channel (40*c*) in such an apparatus can have a second axis (AA) disposed at an angle to the primary axis (A) of the fluid flow channel (200), the arcuate portion (200*a*) of the fluid flow channel (200) routing injection fluid from the distribution channel (40*c*) through an arcuate or curved path over the discontinuous or relieved portion (10*a*, 12*a*, 12*b*, 14*a*, 16*a*, 16*b*, 18*a*, 20*a*, 22*a*, 24*a*) of the rod or pin disposed within the curved or arcuate portion (200*a*) over the course of at least a portion of the upstream downstream (UD) path of travel of the valve pin.

One or more of the discontinuous or relieved portions can have two or more generally flat, planar, concave or convex surfaces (12*a*, 12*b*, 16*a*, 16*b*) disposed at a non-planar angle relative to each other.

Two or more successive discontinuous or relieved portions can each have a generally flat, planar, concave or convex surface disposed at a non-planar angle relative to each other.

The discontinuous or relieved portions are typically formed into the smooth continuous cylindrical outer surface as discontinuities comprising one or more of protrusions, grooves, spiral grooves, spiral grooves, spiral grooves, flats, concave surfaces, convex surfaces, dimples, projections, fins or apertures.

The fluid flow channel typically has a minimum radial diameter and the pin or rod has a maximum radial diameter that is less than the minimum radial diameter of the fluid flow channel in which the pin or rod is disposed such that a flow space is disposed between the discontinuous or relieved portion of the outer circumferential surface of the pin or rod and an interior surface of the flow channel in which the pin or rod is disposed.

In another aspect of the invention there is provided a method of injecting fluid into a mold cavity (80) comprising injecting an injection fluid (60) into the fluid distribution channel (40*c*) and fluid flow channel (200) of an apparatus as described above and controllably operating the actuator (55) to enable the injection fluid (60) to be injected into the mold cavity (80).

In another aspect of the invention there is provide a method of injecting fluid into a mold cavity (80) of an injection molding apparatus (100) comprising an injection molding machine (110), a manifold (40) that receives injection fluid (60) from the machine and routes the injection fluid through a distribution channel (40*c*) from an upstream end (UE) toward a downstream end (DE) of a fluid flow channel (200) that is disposed in the manifold (40) or a nozzle (30) communicating with the distribution channel (40*c*) of the manifold (40), wherein the fluid flow channel (200) has a channel length (LL) and has a generally straight channel section (SS) extending a downstream portion (DP) of the channel length (LL) along which the injection fluid (60) flows from the distribution channel (40*c*) through the fluid flow channel (200) to a gate (70) to the mold cavity (80), the fluid flow channel (200) mating at the downstream end (DE) with the gate (70) to the cavity (80), the apparatus (100) including an actuator (55) interconnected to a rod or pin (10, 12, 16, 18, 22, 120) having an axis (A) having an axial length (L), the actuator (55) and the rod or pin being adapted to enable the pin or rod to be mounted such that that the rod or pin is disposed and drivable by the actuator reciprocally through a path of upstream downstream (UD) travel within the fluid flow channel (200) wherein the pin or rod is drivable to a downstream-most position (DM) where a distal tip end (DTE) of the pin or rod closes the gate (70) off from flow of injection fluid (60) through the gate (70), the fluid flow channel (200) having a channel length (LL), a primary axis (A) of flow and a curved or arcuate portion (200*a*) communicating flow of the injection fluid (60) from the distribution channel (40*c*) through and along the primary axis (A) of the fluid flow channel (200) to a gate (70) to a mold cavity (80), the fluid flow channel (200) communicating at the downstream end (DE) with the gate (70) to the cavity (80), the method comprising:

selecting a rod or pin having a smooth continuous cylindrical outer surface (OS) and one or more discontinuous or relieved portions (10*a*, 12*a*, 12*b*, 16*a*, 16*b*, 18*a*, 18*b*, 18*c*, 22*a*) formed as discontinuities in the cylindrical outer surface, the one or more discontinuous or relieved portions extending axially along one or more selected portions (SD, ED) of the axial length (L) of the rod or pin, mounting the rod or pin (10, 12, 16, 18, 22, 120) such that the rod or pin is prevented from rotating around the axis (A) of the rod or pin, mounting the rod or pin such that the one or more discontinuous or relieved portions (10*a*, 12*a*, 12*b*, 16*a*, 16*b*, 18*a*, 18*b*, 18*c*, 22*a*) are disposed within the fluid flow channel (200) and the curved or arcuate portion (200*a*) of the fluid flow channel (200) over the course of at least a portion of the reciprocal upstream downstream (UD) path of travel of the valve pin, injecting injection fluid (60) from the fluid distribution channel (40*c*) to flow through the fluid flow channel (200), wherein the one or more discontinuous or relieved portions (10*a*, 12*a*, 12*b*, 16*a*, 16*b*, 18*a*, 18*b*, 18*c*, 22*a*) are configured and arranged along the axial length (L) of the pin or rod such that the flow of injection fluid over or past the one or more discontinuous or relieved portions disposed in the straight section (SS) is modified to flow at substantially different rates or velocities or in substantially different flow patterns relative to rate or velocity or pattern of flow of injection fluid over or past the smooth continuous cylindrical outer suface (OS).

In such an apparatus the distribution channel (40*c*) can have a second axis (AA) disposed at an angle (X) to the primary axis (A) of the fluid flow channel (200), the arcuate portion (200*a*) of the fluid flow channel (200) routing injection fluid from the distribution channel (40*c*) through an arcuate or curved path over the discontinuous or relieved portion (10*a*, 12*a*, 12*b*, 14*a*, 16*a*, 16*b*, 18*a*, 20*a*, 22*a*, 24*a*) of the rod or pin disposed within the curved or arcuate portion (200*a*) over the course of at least a portion of the upstream downstream (UD) path of travel of the valve pin.

In another aspect of the invention there is provided an injection molding apparatus (100) comprising an injection molding machine (110), a manifold (40) that receives injection fluid (60) from the machine and routes the injection fluid through a distribution channel (40*c*) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL), a primary axis (A) of flow and a curved or arcuate portion (200a) communicating flow of the injection fluid (60) from the distribution channel (40c) through and along the primary axis (A) of the fluid flow channel (200) to a gate (70) to a mold cavity (80), the fluid flow channel (200) communicating at the downstream end (DE) with the gate (70) to the cavity (80), the apparatus (100) including an actuator (55) interconnected to a rod or pin (10, 12, 14, 16, 18, 20, 22, 24, 26, 120), the actuator (55) being adapted to dispose and drive the rod or pin reciprocally through a path of upstream downstream (UD) travel along the primary axis (A) of the fluid flow channel (200), the rod or pin having a smooth cylindrical outer surface (OS) adapted to enable the injection fluid to flow over the smooth cylindrical outer surface (OS) in a continuous nonturbulent stream of flow, the rod or pin including one or more discontinuous or relieved portions (10a, 12a, 12b, 14a, 16a, 16b, 18a, 20a, 22a, 24a) formed as discontinuities in the cylindrical outer surface (OS) including one or more of protrusions, grooves, spiral grooves, spiral grooves, spiral grooves, flats, concave surfaces, convex surfaces, dimples, projections, fins or apertures that extend along one or more selected portions (SD, ED) of the axial length (LL) of the fluid flow channel (200), the actuator (55), the fluid flow channel (200), the rod or pin being adapted such that at least one discontinuous or relieved portion (10a, 12a, 12b, 14a, 16a, 16b, 18a, 20a, 22a, 24a) of the rod or pin is disposed within the curved or arcuate portion (200a) of the fluid flow channel (200) over the course of at least a portion of the reciprocal upstream downstream (UD) path of travel of the valve pin, the apparatus (100) including a second actuator (50) having a drivably rotatable rotor interconnected to the rod or pin in an arrangement where the rod or pin is drivably rotatable around its axis (A) within the fluid flow channel to create turbulence in the stream of flow of the injection fluid by rotation of the one or more discontinuous or relieved portions (10a, 12a, 12b, 14a, 16a, 16b, 18a, 20a, 22a, 24a) of the rod or pin, the one or more discontinuous or relieved portions (10a, 12a, 12b, 14a, 16a, 16b, 18a, 20a, 22a, 24a) being configured such that the flow of injection fluid over or past the one or more discontinuous or relieved portions disposed within the straight section (SS) is modified to flow at substantially different rates or velocities or in substantially different flow patterns relative to rate or velocity or pattern of flow of injection fluid over or past the smooth continuous cylindrical outer suface (OS).

The one or more discontinuous or relieved portions are preferably formed into the smooth cylindrical outer surface (OS) in a configuration having a generally flat, planar, concave or convex surface (10a, 10aa, 10aaa 12a, 12b, 16a, 16b, 18a, 18b, 18c, 22a).

In such an apparatus the distribution channel (40c) can have a second axis (AA) disposed at an angle (X) to the primary axis (A) of the fluid flow channel (200), the arcuate portion (200a) of the fluid flow channel (200) routing injection fluid from the distribution channel (40c) through an arcuate or curved path over the discontinuous or relieved portion (10a, 12a, 12b, 14a, 16a, 16b, 18a, 20a, 22a, 24a) of the rod or pin disposed within the curved or arcuate portion (200a) over the course of at least a portion of the upstream downstream (UD) path of travel of the valve pin.

In such an apparatus the one or more of the discontinuous or relieved portions typically have two or more generally flat, planar, concave or convex surfaces (12a, 12b, 16a, 16b) disposed at a non-planar angle relative to each other.

Two or more successive discontinuous or relieved portions can each have a generally flat, planar, concave or convex surface disposed at a non-planar angle relative to each other.

The discontinuous or relieved portions are preferably formed into the smooth continuous cylindrical outer surface as discontinuities comprising one or more of protrusions, grooves, spiral grooves, spiral grooves, spiral grooves, flats, concave surfaces, convex surfaces, dimples, projections, fins or apertures.

The fluid flow channel typically has a minimum radial diameter and the pin or rod has a maximum radial diameter that is less than the minimum radial diameter of the fluid flow channel in which the pin or rod is disposed such that a flow space is disposed between the discontinuous or relieved portion of the outer circumferential surface of the pin or rod and an interior surface of the flow channel in which the pin or rod is disposed.

In another aspect of the invention there is provided a method of injecting fluid into a mold cavity (80) comprising injecting an injection fluid (60) into the fluid distribution channel (40c) and fluid flow channel (200) of an apparatus as described above and controllably operating the actuator (55) to enable the injection fluid (60) to be injected into the mold cavity (80).

In another aspect of the invention there is provided a method of injecting fluid into a mold cavity (80) of an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL), a primary axis (A) of flow and a curved or arcuate portion (200a) communicating flow of the injection fluid (60) from the distribution channel (40c) through and along the primary axis (A) of the fluid flow channel (200) to a gate (70) to a mold cavity (80), the fluid flow channel (200) communicating at the downstream end (DE) with the gate (70) to the cavity (80), the fluid flow channel (200) having a generally straight channel section (SS) extending a downstream portion (DP) of the channel length (LL) along which the injection fluid (60) flows from the distribution channel (40c) through the fluid flow channel (200) to a gate (70) to the mold cavity (80), the fluid flow channel (200) mating at the downstream end (DE) with the gate (70) to the cavity (80), the apparatus (100) including an actuator (55) interconnected to a rod or pin (10, 12, 16, 18, 22, 120) having an axis (A) having an axial length (L), the actuator (55) and the rod or pin being adapted to enable the pin or rod to be mounted such that that the rod or pin is disposed and drivable by the actuator reciprocally through a path of upstream downstream (UD) travel within the fluid flow channel (200) wherein the pin or rod is drivable to a downstream-most position (DM) where a distal tip end (DTE) of the pin or rod closes the gate (70) off from flow of injection fluid (60) through the gate (70), the apparatus (100) including a second actuator (50) having a drivably rotatable rotor interconnected to the rod or pin in an arrangement where the rod or pin is drivably rotatable around its axis (A) within the fluid flow channel to create turbulence in the stream of flow of the injection fluid by rotation of the one or more discontinuous or relieved portions (10a, 12a, 12b, 14a, 16a, 16b, 18a, 20a, 22a, 24a) of the rod or pin, the method comprising:

selecting a rod or pin having a smooth continuous cylindrical outer surface (OS) and one or more discontinuous or relieved portions (10a, 12a, 12b, 16a, 16b, 18a, 18b, 18c, 22a) formed as discontinuities in the cylindrical outer surface, the one or more discontinuous or relieved portions extending axially along one or more selected portions (SD, ED) of the axial length (L) of the rod or pin, mounting the rod or pin such that the one or more discontinuous or relieved portions (10a, 12a, 12b, 16a, 16b, 18a, 18b, 18c, 22a) are disposed within the fluid flow channel (200), injecting injection fluid (60) from the fluid distribution channel (40c) to flow through the fluid flow channel (200), operating the actuator (55) and the second actuator (50) to drive the pin or rod both upstream downstream (UD) and rotationally around its axis (A), wherein the one or more discontinuous or relieved portions (10a, 12a, 12b, 16a, 16b, 18a, 18b, 18c, 22a) are configured and arranged along the axial length (L) of the pin or rod such that the flow of injection fluid over or past the one or more discontinuous or relieved portions disposed in the straight section (SS) is modified to flow at substantially different rates or velocities or in substantially different flow patterns relative to rate or velocity or pattern of flow of injection fluid over or past the smooth continuous cylindrical outer suface (OS).

In such a method the distribution channel (40c) typically has a second axis (AA) disposed at an angle (X) to the primary axis (A) of the fluid flow channel (200), the arcuate portion (200a) of the fluid flow channel (200) routing injection fluid from the distribution channel (40c) through an arcuate or curved path over the discontinuous or relieved portion (10a, 12a, 12b, 14a, 16a, 16b, 18a, 20a, 22a, 24a) of the rod or pin disposed within the curved or arcuate portion (200a) over the course of at least a portion of the upstream downstream (UD) path of travel of the valve pin.

In another aspect of the invention there is provided an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL) and having a generally straight channel section (SS) extending a downstream portion (DP) of the channel length (LL) along which the injection fluid (60) flows from the distribution channel (40c) through the fluid flow channel (200) to a gate (70) to a mold cavity (80), the fluid flow channel (200) mating at the downstream end (DE) with the gate (70) to the cavity (80), the apparatus (100) including a channel insert (26) comprising a cylindrical wall (26w) having an outer circumferential surface (26s) complementary in configuration to the configuration of an inner surface (IS) of the fluid flow channel (200), the inner surface (IS) of the fluid flow channel (200) being adapted to receive and concentrically mount the cylindrical wall (26w) of the insert at a selected axial position (SAP) along the channel length (LL), the cylindrical wall (26w) of the channel insert (26) including an interior mesh (26m) connected to an interior surface (26wis) of the cylindrical wall, the mesh (26m) forming one or more internal flow apertures (26h) within the fluid flow channel (200), the channel insert (26) including a pin or rod (27) having an axis (Al) mounted to the mesh (26m) in an arrangement wherein the pin or rod (27) is disposed within the fluid flow channel (200) and the axis (Al) of the pin or rod (27) is generally aligned with or parallel to the axis (A) of the fluid flow channel (200), the pin or rod having a smooth continuous cylindrical outer surface (OS) and including one or more discontinuous or relieved portions (26a) formed as discontinuities in the cylindrical outer surface (OS), the one or more discontinuous or relieved portions (26a) extending axially along one or more selected portions (SD) of the axial length (L) of the rod or pin that extends downstream of the internal flow apertures (26h), the one or more discontinuous or relieved portions (26a) being configured and arranged along the axial length (L) of the pin or rod such that the flow of injection fluid over or past the one or more discontinuous or relieved portions is modified to flow at substantially different rates or velocities or in substantially different flow patterns relative to rate or velocity or pattern of flow of injection fluid over or past the smooth continuous cylindrical outer suface (OS).

In such an apparatus the selected axial position (SAP), the axial length (L) of the pin or rod (27) and the channel insert (26) are preferably adapted to dispose the pin or rod (27) including the discontinuous or relieved portions (26a) immediately upstream of the gate (70) to the cavity (80).

The channel insert (26) and the interior surface (IS) of the fluid flow channel (200) are preferably adapted to prevent the rod or pin (27) or the channel insert (26) from rotating within the fluid flow channel (200).

The one or more discontinuous or relieved portions are typically formed into the smooth cylindrical outer surface (OS) in a configuration having a generally flat, planar, concave or convex surface (26a).

The discontinuous or relieved portions can be formed into the smooth continuous cylindrical outer surface as discontinuities comprising one or more of protrusions, grooves, spiral grooves, flats, concave surfaces, convex surfaces, dimples, projections, fins or apertures.

The fluid flow channel can have a minimum radial diameter and the pin or rod has a maximum radial diameter that is less than the minimum radial diameter of the fluid flow channel in which the pin or rod is disposed such that a flow space is disposed between the discontinuous or relieved portion of the outer circumferential surface of the pin or rod and an interior surface of the flow channel in which the pin or rod is disposed.

In another aspect of the invention there is provided a method of injecting fluid into a mold cavity (80) comprising injecting an injection fluid (60) into the fluid flow channel (200) of an apparatus as described above under an injection pressure such that the injection fluid (60) is injected from the fluid flow channel (200) into the mold cavity (80).

In another aspect of the invention there is provided a method of injecting fluid (60) into a mold cavity (80) of an injection molding apparatus (100) comprising an injection molding machine (110), a manifold (40) that receives injection fluid (60) from the machine and routes the injection fluid through a distribution channel (40c) from an upstream end (UE) toward a downstream end (DE) of a fluid flow channel (200) that is disposed in the manifold (40) or a nozzle (30) communicating with the distribution channel (40c) of the manifold (40), the fluid flow channel (200) having a channel length (LL) and having a generally straight channel section (SS) extending a downstream portion (DP) of the channel length (LL) along which the injection fluid (60) flows from the distribution channel (40c) through the fluid flow channel (200) to a gate (70) to a mold cavity (80), the fluid flow channel (200) mating at the downstream end (DE) with the gate (70) to the cavity (80), the method comprising:

mounting in the fluid flow channel (200) a channel insert (26) comprising a cylindrical wall (26w) having an outer circumferential surface (26s) complementary in configuration to the configuration of an inner surface (IS) of the fluid flow channel (200), the inner surface (IS) of the fluid flow channel (200) being adapted to receive and concentrically mount the cylindrical wall (26w) of the insert at a selected axial position (SAP) along the channel length (LL), the cylindrical wall (26w) of the channel insert (26) including an interior mesh (26m) connected to an interior surface (26wis) of the cylindrical wall, the mesh (26m) forming one or more internal flow apertures (26h) within the fluid flow channel (200), the channel insert (26) including a pin or rod (27) having an axis (Al) mounted to the mesh (26m) in an arrangement wherein the pin or rod (27) is disposed within the fluid flow channel (200) and the axis (Al) of the pin or rod (27) is generally aligned with or parallel to the axis (A) of the fluid flow channel (200), the pin or rod having a smooth continuous cylindrical outer surface (OS) and including one or more discontinuous or relieved portions (26a) formed as discontinuities in the cylindrical outer surface (OS), the one or more discontinuous or relieved portions (26a) extending axially along one or more selected portions (SD) of the axial length (L) of the rod or pin that extends downstream of the internal flow apertures (26h), the one or more discontinuous or relieved portions (26a) being configured and arranged along the axial length (L) of the pin or rod such that the flow of injection fluid over or past the one or more discontinuous or relieved portions is modified to flow at substantially different rates or velocities or in substantially different flow patterns relative to rate or velocity or pattern of flow of injection fluid over or past the smooth continuous cylindrical outer sufface (OS), injecting injection fluid (60) from the machine 110 into the fluid flow channel (200) under an injection pressure such that the injection fluid (60) is injected from the fluid flow channel (200) into the mold cavity (80).

BRIEF DESCRIPTION OF THE DRAWINGS

The above and further advantages of the invention may be better understood by referring to the following description in conjunction with the accompanying drawings in which:

FIG. 1A is a perspective view of one embodiment of a flow disrupting rod, pin or shaft having a flat groove or recess formed into the normally continuous smooth circumferential surface of a cylindrical rod or pin.

FIG. 1B is a side view of the FIG. 1A rod.

FIG. 1E is a sectional view along lines 1E-1E of FIG. 1B.

FIG. 1AA is a perspective view of another embodiment of a flow disrupting rod, pin or shaft having a concave surface indentation formed into the normally continuous smooth circumferential surface of a cylindrical rod or pin.

FIG. 1EE is a sectional view along lines 1EE-1EE of FIG. 1AA.

FIG. 1AAA is a perspective view of another embodiment of a flow disrupting rod, pin or shaft having a convex surface formed into the normally continuous smooth circumferential surface of a cylindrical rod or pin.

FIG. 1EEE is a sectional view along lines 1EEE-1EEE of FIG. 1AAA.

FIG. 1C is side cross-sectional view of the heated distribution manifold and associated nozzle and mold plate components of an injection molding system showing the FIGS. 1A, 1B rod or pin from a side view disposed coaxially within the flow channel of the nozzle whose distal end gate mates with the gate to a mold.

FIG. 1D is an end sectional view of the system components of FIG. 10 showing the rod or pin from an end view.

FIG. 2A is a perspective view of another embodiment of a flow disrupting rod, pin or shaft having a pair of flats formed at another position along the axial length of the rod or pin into the normally continuous smooth circumferential surface of an otherwise cylindrical rod or pin.

FIG. 2B is a side view of the FIG. 2A rod.

FIG. 2E is sectional view taken along lines 2E-2E of FIG. 2B.

FIG. 3A is a side view of another embodiment of a flow disrupting rod, pin or shaft having multiple dimples formed into the normally continuous smooth circumferential surface of an otherwise cylindrical rod or pin.

FIG. 3B is a perspective view of the FIG. 3A rod.

FIG. 3E is an enlarged view of a portion of the dimpled surface of the FIGS. 3A, 3B rod or pin taken within circle 3E-3E of FIG. 3B.

FIG. 4A is a perspective view of one embodiment of a flow disrupting rod, pin or shaft having a pair of 180 degree opposing flats or flat grooves or recesses formed into the normally continuous smooth circumferential surface of an otherwise cylindrical rod or pin.

FIG. 4B is a side view of the FIG. 1A rod.

FIG. 4E is a sectional view taken along lines 4E-4E of FIG. 4B.

FIG. 5A is a side view of another embodiment of a flow disrupting rod, pin or shaft having multiple flats or flat grooves or recesses formed along multiple selected lengths along the axis of the rod or pin, the flats or grooves being formed into the normally continuous smooth circumferential surface of an otherwise cylindrical rod or pin.

FIG. 5B is a perspective view of the FIG. 5A rod.

FIG. 5E is sectional view taken along lines 5E-5E of FIG. 5B.

FIG. 8A is a side view of another embodiment of a flow disrupting rod, pin or shaft having a spiral groove or recess formed into the normally continuous smooth circumferential surface of an otherwise cylindrical rod or pin.

FIG. 8B is a perspective view of the FIG. 8A rod.

FIG. 8E is sectional view taken along lines 8E-8E of FIG. 8B.

FIG. 9C is side cross-sectional view of the heated distribution manifold and associated nozzle and mold plate components of an injection molding system showing the FIGS. 9A, 9B plug or insert with rod or pin from a side view disposed coaxially within the flow channel of the nozzle whose distal end gate mates with the gate to a mold.

FIG. 9D is an end sectional view of the system components of FIG. 9C showing the rod or pin from an end view.

DETAILED DESCRIPTION

Figures 2C, 2D:
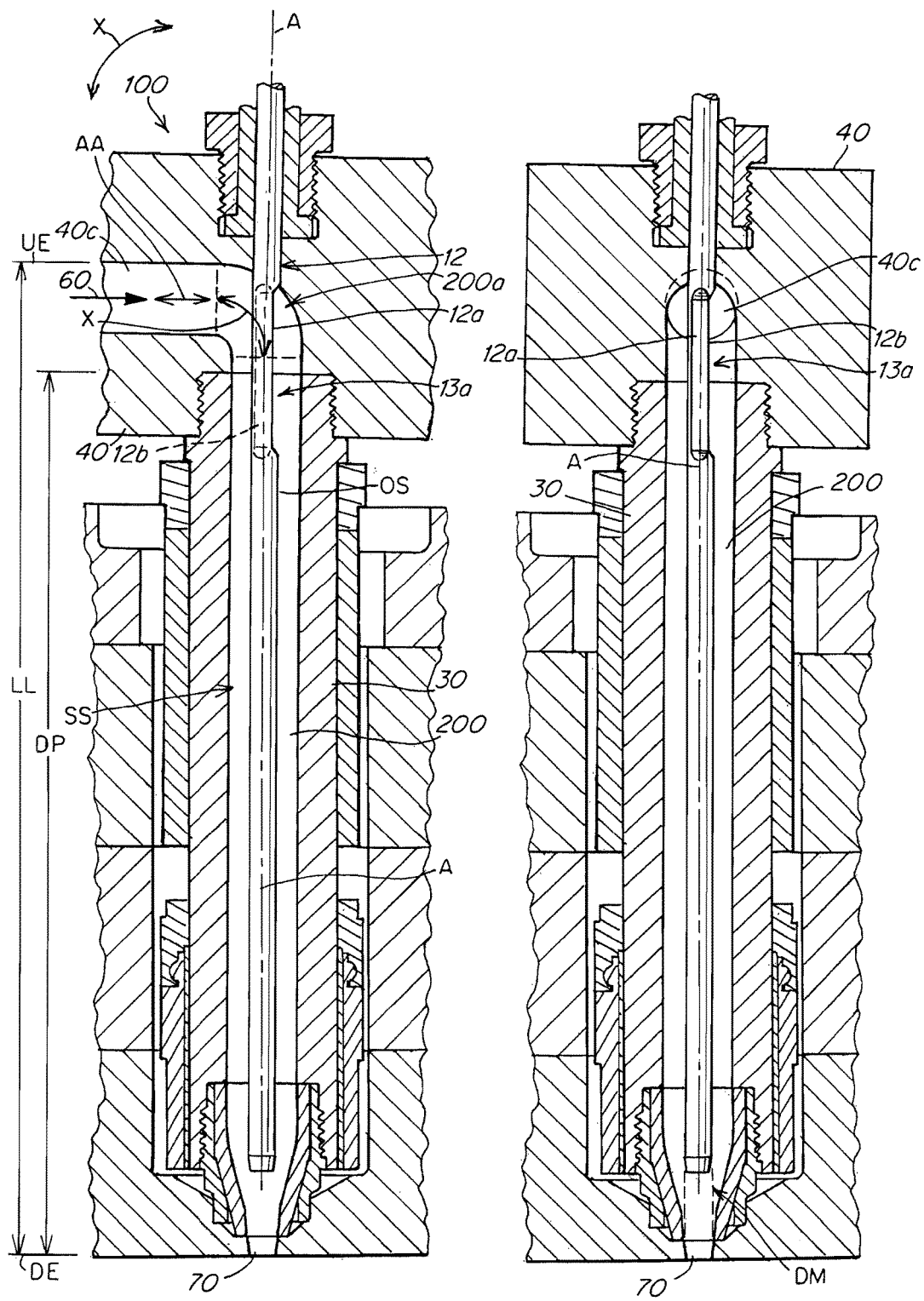
FIG. 2C is side cross-sectional view of the heated distribution manifold and associated nozzle and mold plate components of an injection molding system showing the FIGS. 2A, 2B rod or pin from a side view disposed coaxially within the flow channel of the nozzle whose distal end gate mates with the gate to a mold.
FIG. 2D is an end sectional view of the system components of FIG. 2C showing the rod or pin from an end view.
Figures 3C, 3D:
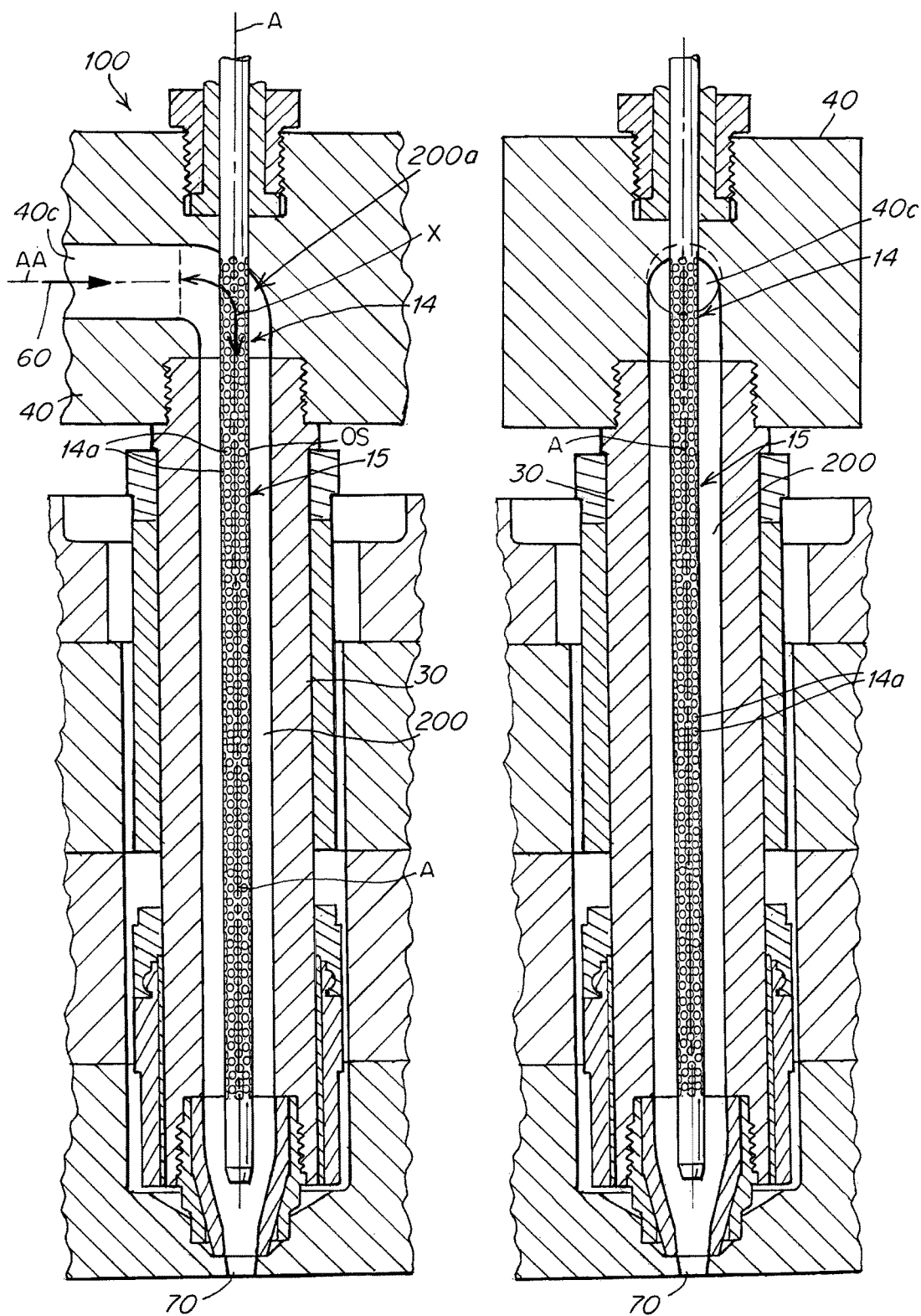
FIG. 3C is side cross-sectional view of the heated distribution manifold and associated nozzle and mold plate components of an injection molding system showing the FIGS. 3A, 3B rod or pin from a side view disposed coaxially within the flow channel of the nozzle whose distal end gate mates with the gate to a mold.
FIG. 3D is an end sectional view of the system components of FIG. 1C showing the rod or pin from an end view.
Figures 4C, 4D:
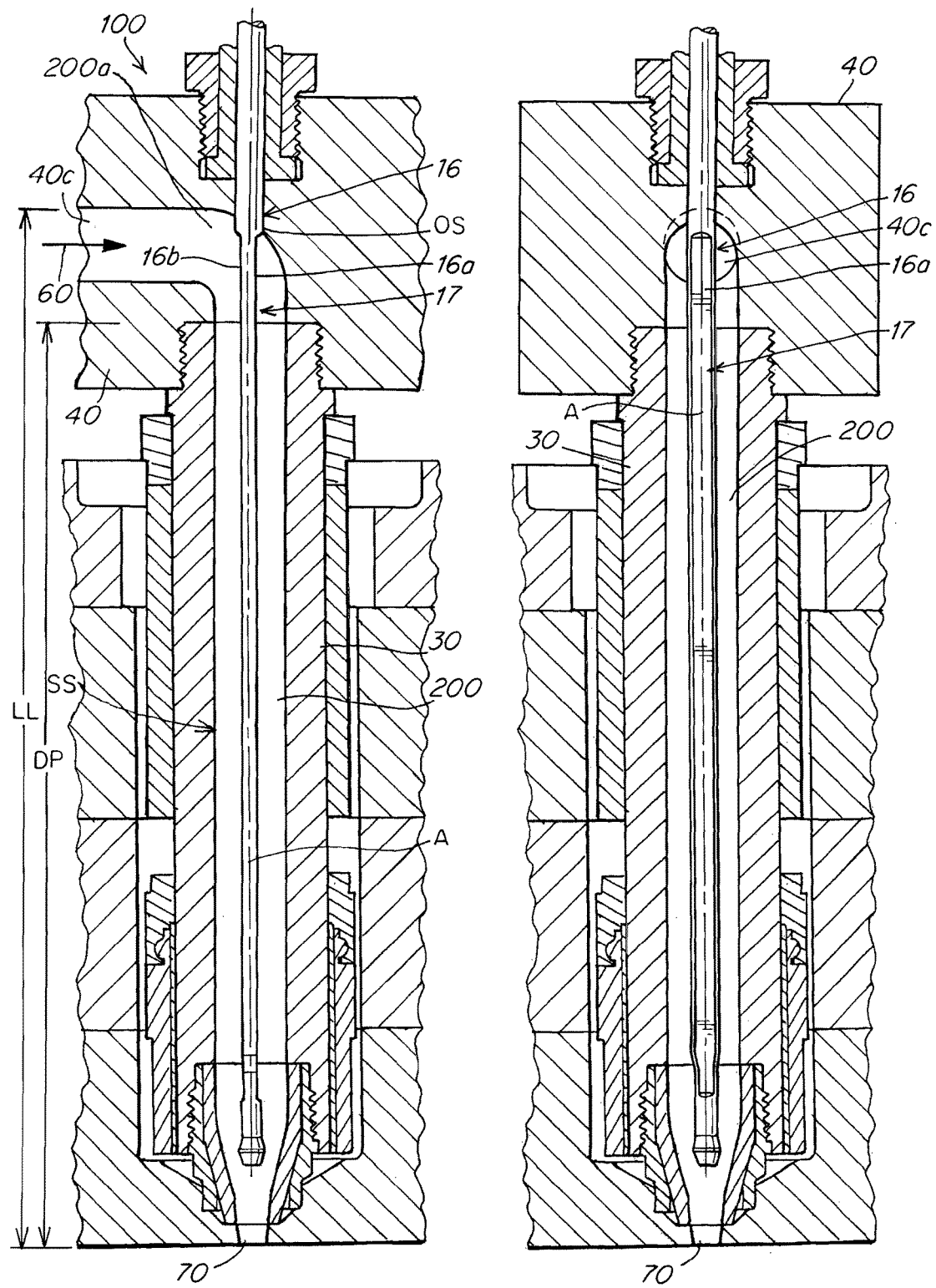
FIG. 4C is side cross-sectional view of the heated distribution manifold and associated nozzle and mold plate components of an injection molding system showing the FIGS. 4A, 4B rod or pin from a side view disposed coaxially within the flow channel of the nozzle whose distal end gate mates with the gate to a mold.
FIG. 4D is an end sectional view of the system components of FIG. 4C showing the rod or pin from an end view.
Figures 5C, 5D:
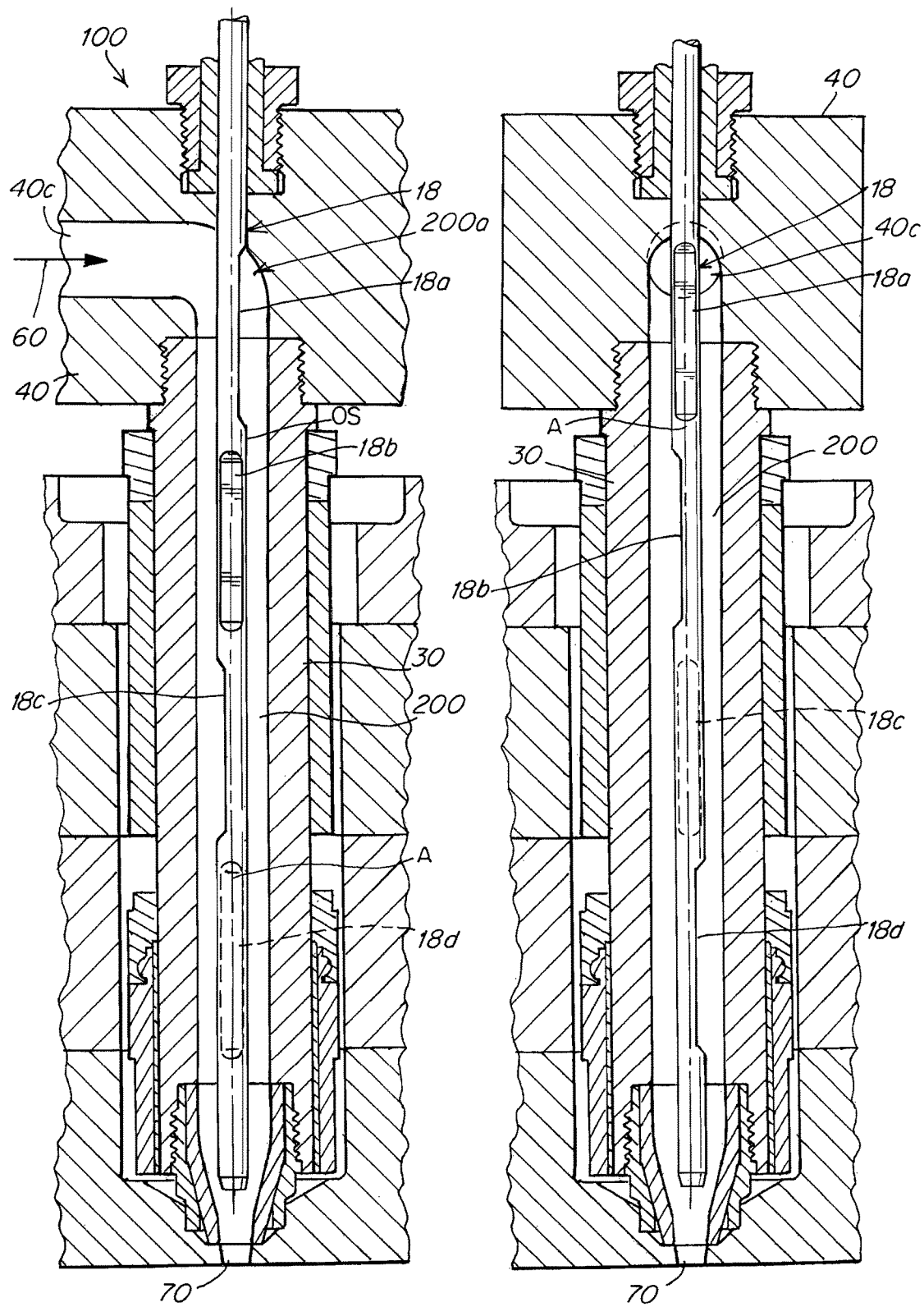
FIG. 5C is side cross-sectional view of the heated distribution manifold and associated nozzle and mold plate components of an injection molding system showing the FIGS. 5A, 5B rod or pin from a side view disposed coaxially within the flow channel of the nozzle whose distal end gate mates with the gate to a mold.
FIG. 5D is an end sectional view of the system components of FIG. 5C showing the rod or pin from an end view.
Figures 6A, 6B, 6E:
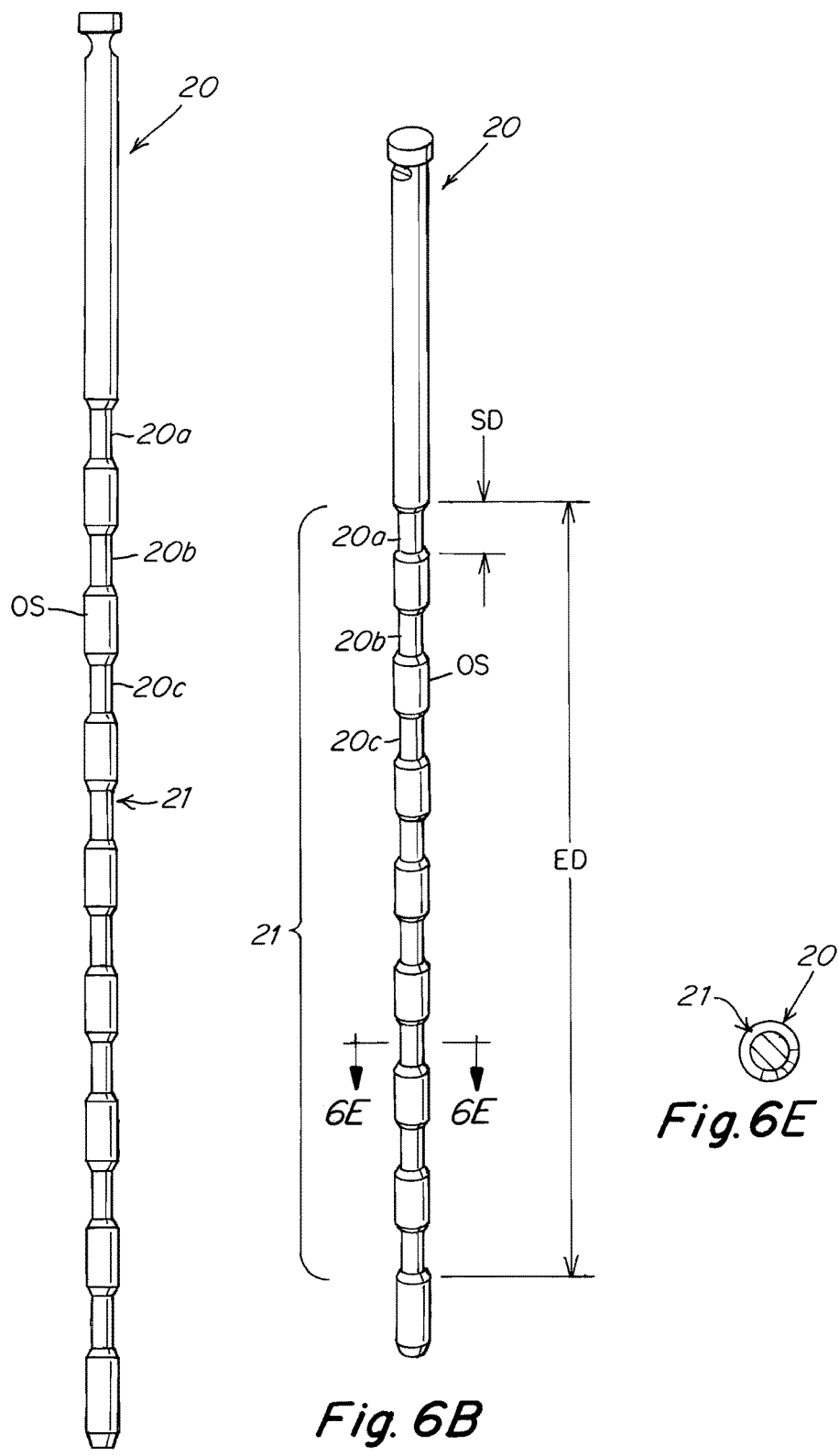
FIG. 6A is a side view of another embodiment of a flow disrupting rod, pin or shaft having multiple graduated reduced diameter grooves formed at multiple locations along the axial length of the rod or pin, the grooves being formed into the normally continuous smooth circumferential surface of an otherwise cylindrical rod or pin.
FIG. 6B is a perspective view of the FIG. 6A rod.
FIG. 6E is sectional view taken along lines 6E-6E of FIG. 6B.
Figure 6C:
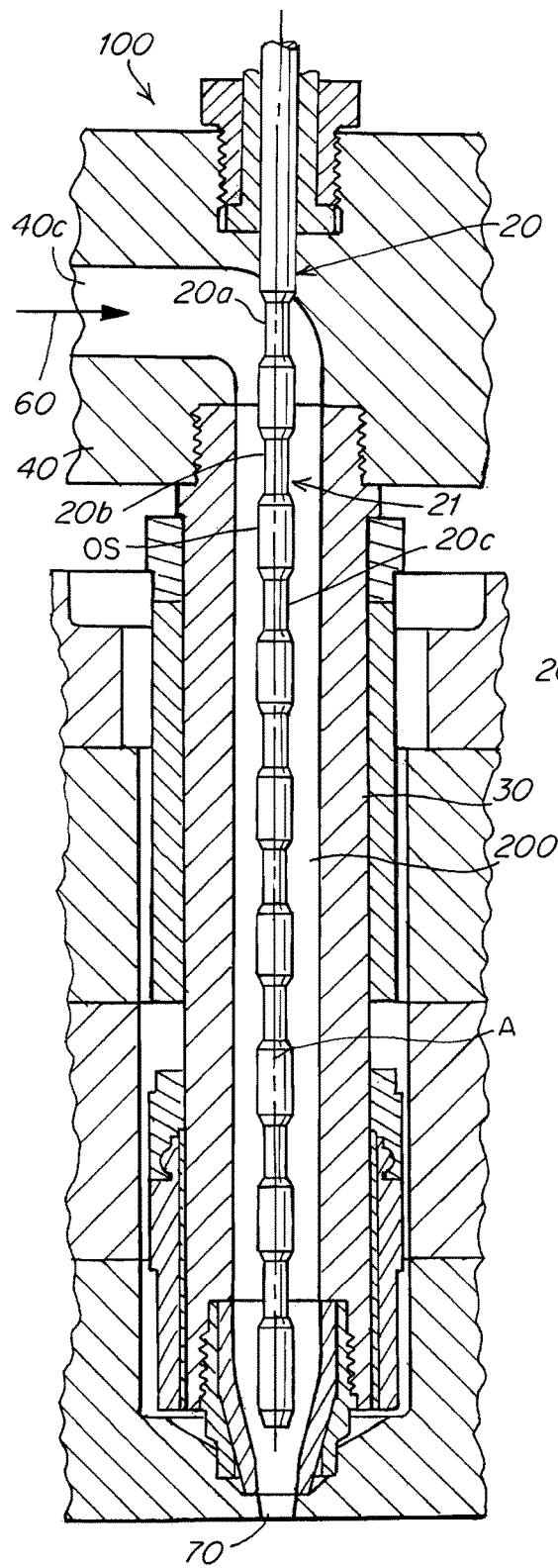
FIG. 6C is side cross-sectional view of the heated distribution manifold and associated nozzle and mold plate components of an injection molding system showing the FIGS. 6A, 6B rod or pin from a side view disposed coaxially within the flow channel of the nozzle whose distal end gate mates with the gate to a mold.
Figure 6D:
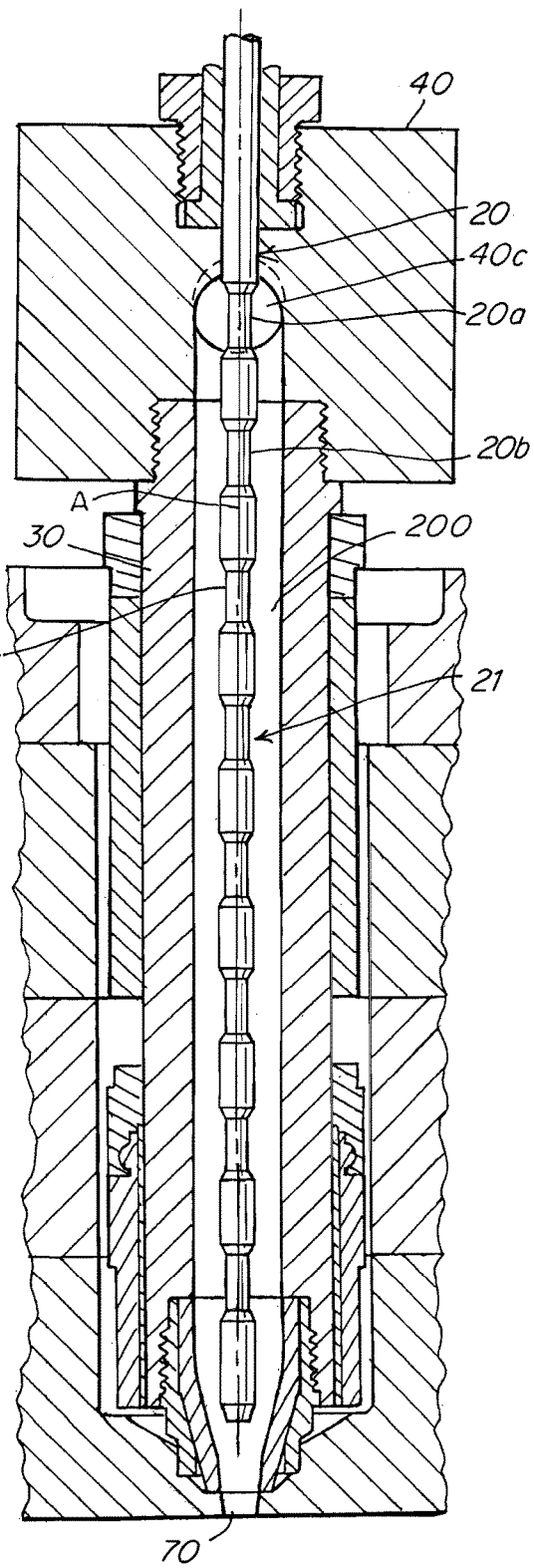
FIG. 6D is an end sectional view of the system components of FIG. 6C showing the rod or pin from an end view.
Figures 7A, 7B, 7E:
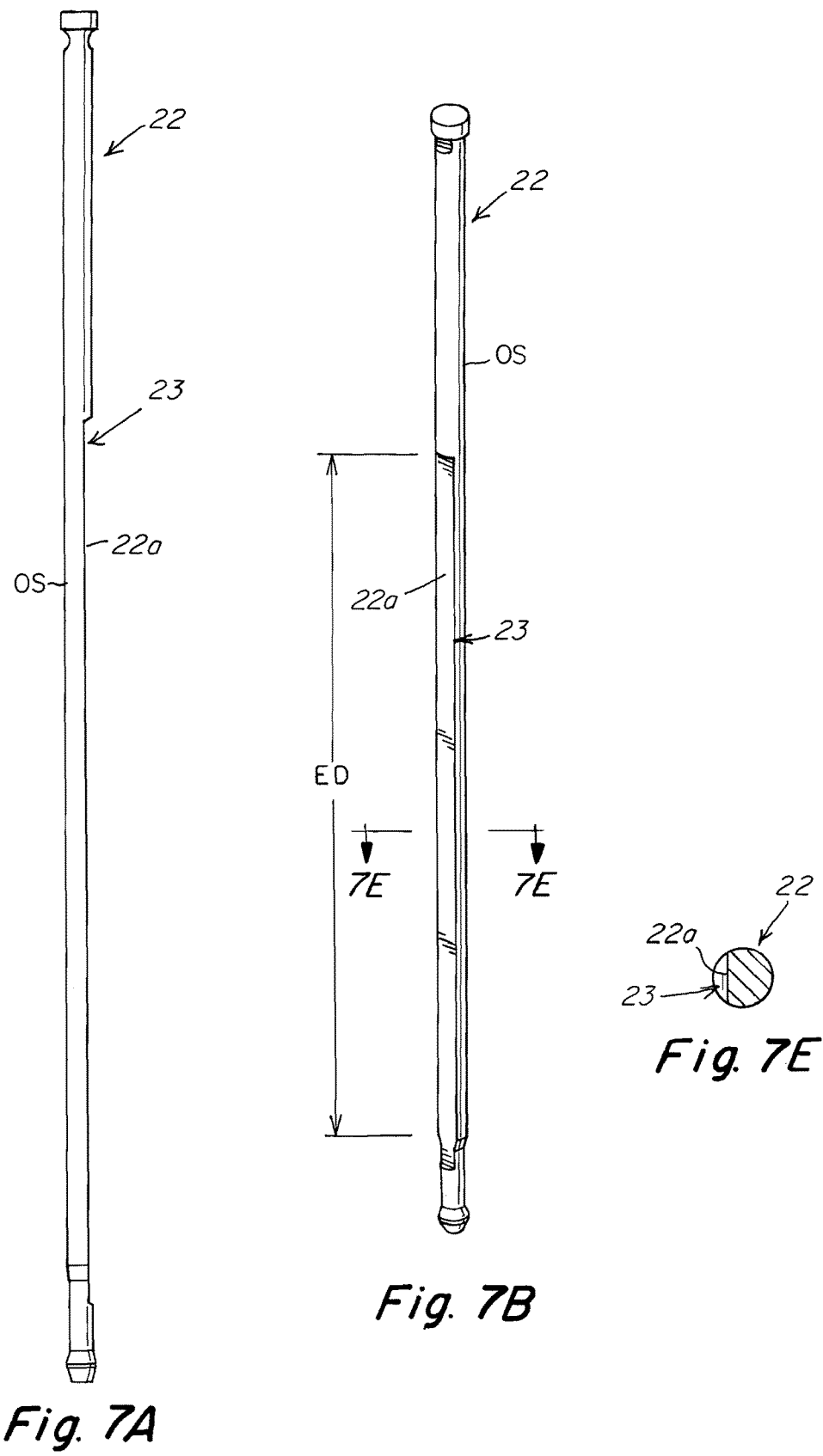
FIG. 7A is a side view of another embodiment of a flow disrupting rod, pin or shaft having an elongated flat or flat groove or recess formed into the normally continuous smooth circumferential surface of a cylindrical rod or pin.
FIG. 7B is a perspective view of the FIG. 7A rod.
FIG. 7E is sectional view taken along lines 7E-7E of FIG. 7B.
Figure 7C:
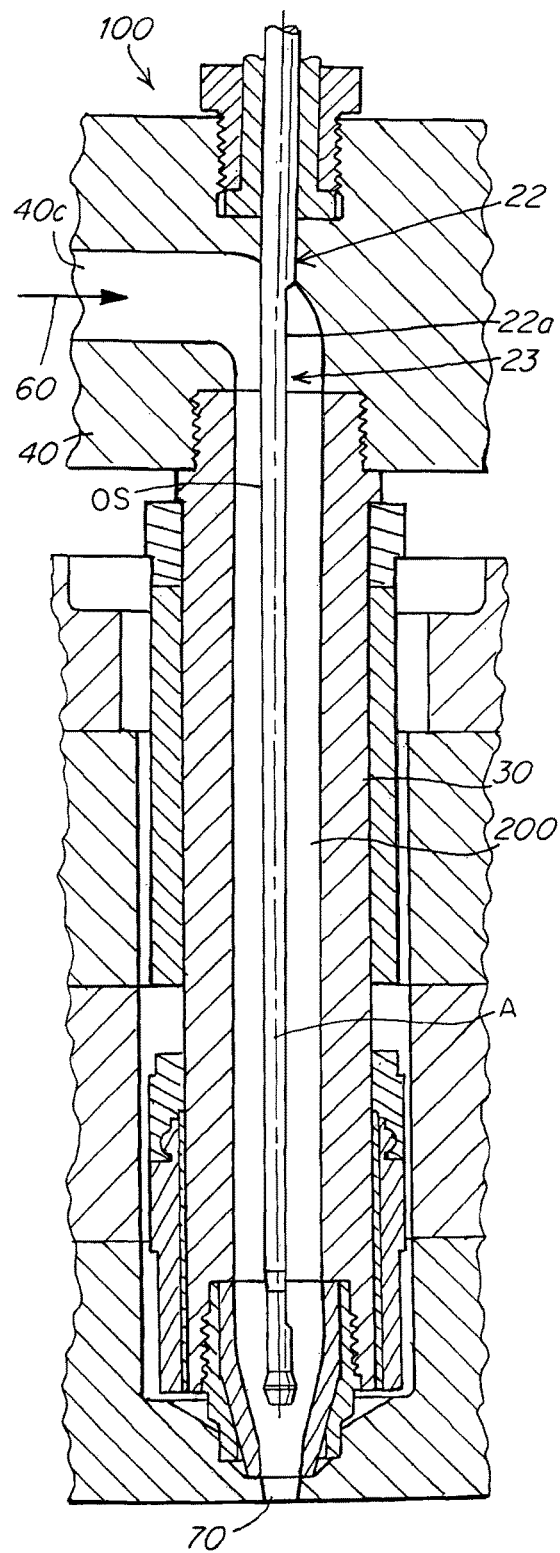
FIG. 7C is side cross-sectional view of the heated distribution manifold and associated nozzle and mold plate components of an injection molding system showing the FIGS. 7A, 7B rod or pin from a side view disposed coaxially within the flow channel of the nozzle whose distal end gate mates with the gate to a mold.
Figure 7D:
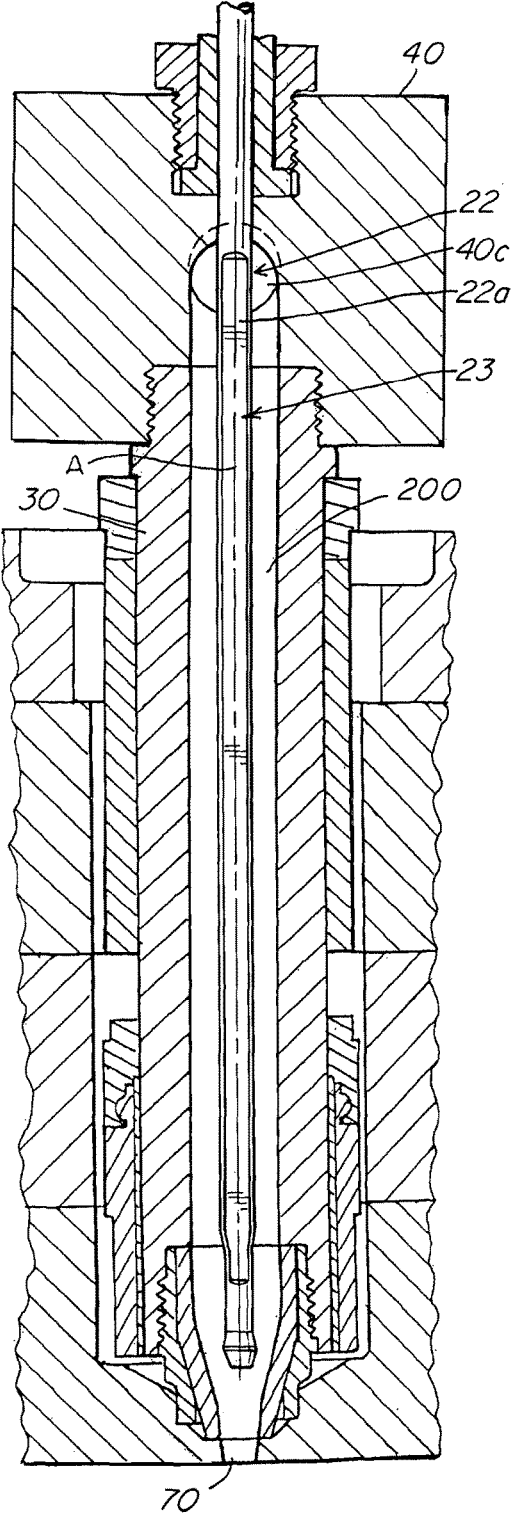
FIG. 7D is an end sectional view of the system components of FIG. 7C showing the rod or pin from an end view.
Figure 8C:
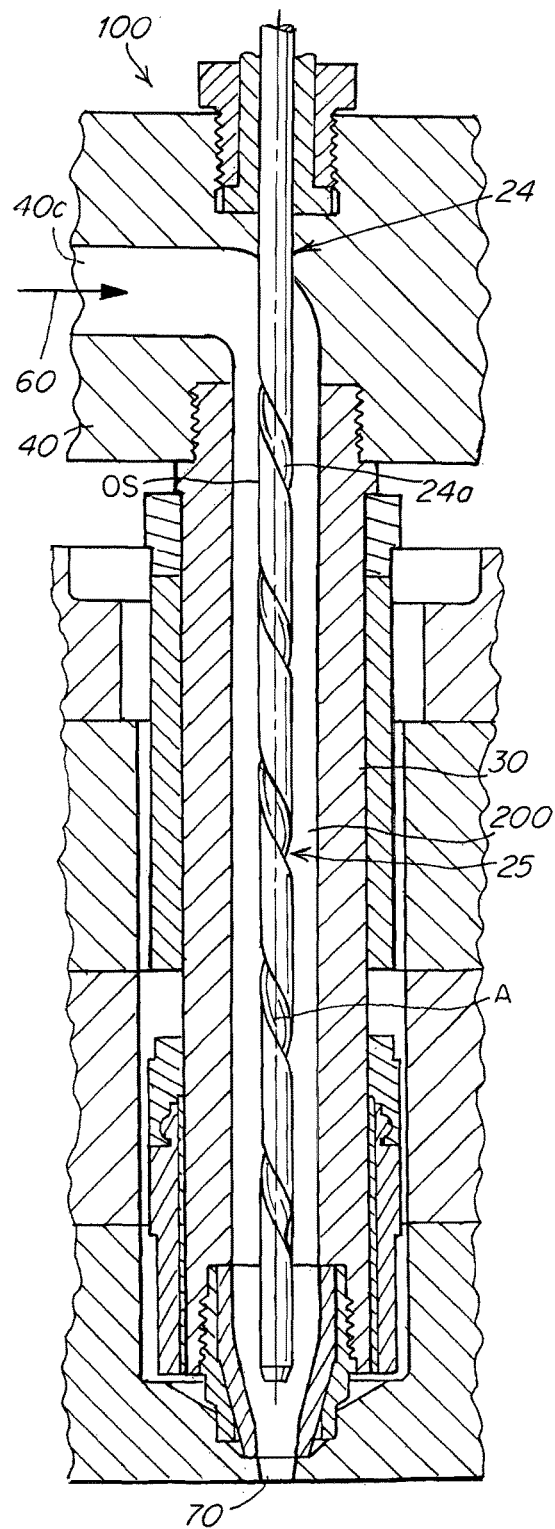
FIG. 8C is side cross-sectional view of the heated distribution manifold and associated nozzle and mold plate components of an injection molding system showing the FIGS. 8A, 8B rod or pin from a side view disposed coaxially within the flow channel of the nozzle whose distal end gate mates with the gate to a mold.
Figure 8D:
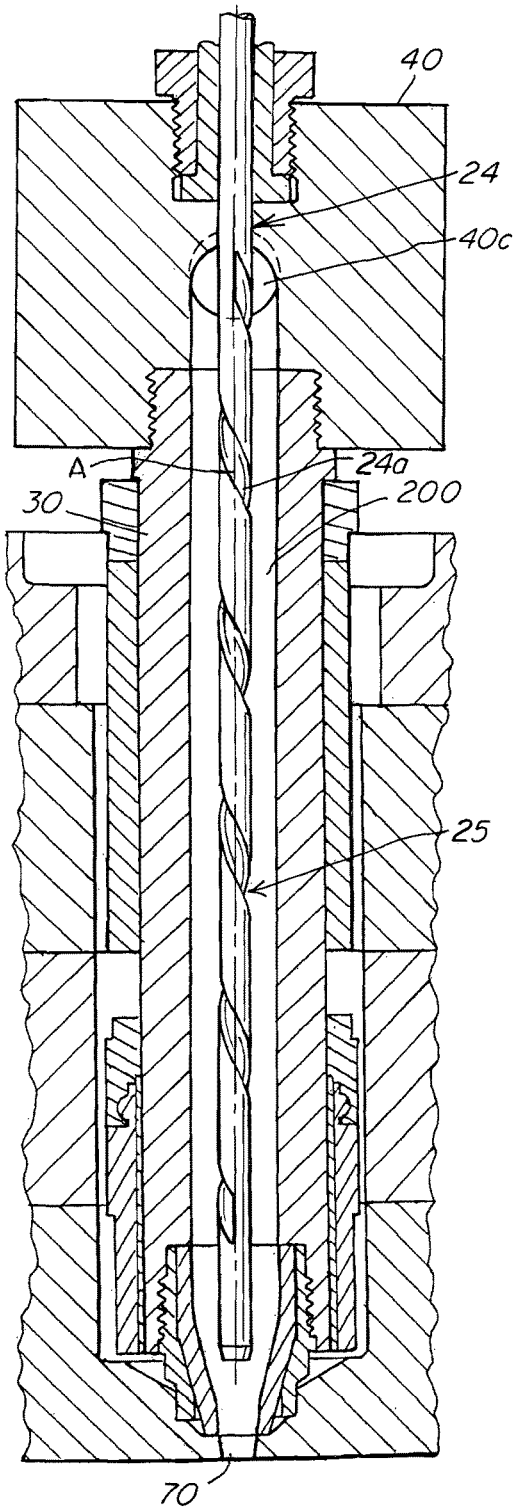
FIG. 8D is an end sectional view of the system components of FIG. 8C showing the rod or pin from an end view.
Figure 9A:
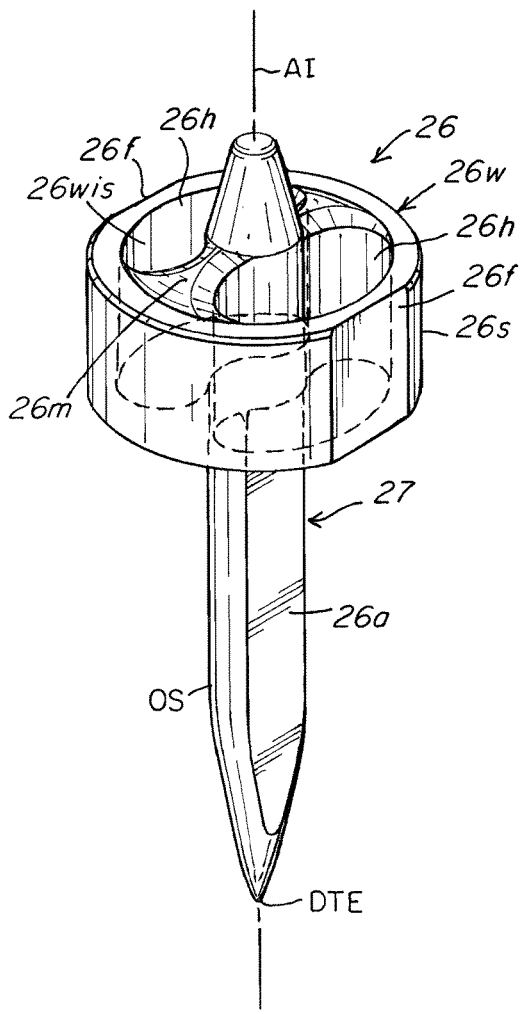
FIG. 9A is a top perspective view of an embodiment of a plug or insert to a fluid flow channel, the plug or insert having shortened internally downstream mountable flow disrupting rod, pin or shaft having a flat groove or recess formed into the normally continuous smooth circumferential surface of the downstream rod or stem portion of the device (not shown in the rear side orientation of FIG. 9A.
Figure 9B:
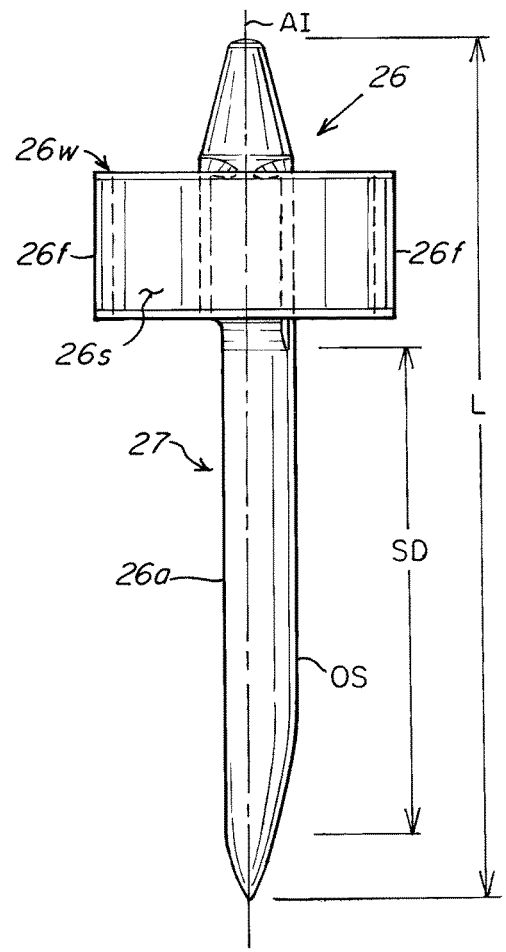
FIG. 9B is a side view of the FIG. 9A plug or insert showing the rod or pin turned 90 degrees relative to the view shown in FIG. 9A showing the flat groove or recess formed into the normally continuous smooth circumferential surface of an otherwise cylindrical rod or stem portion of the device.
Figure 9E:
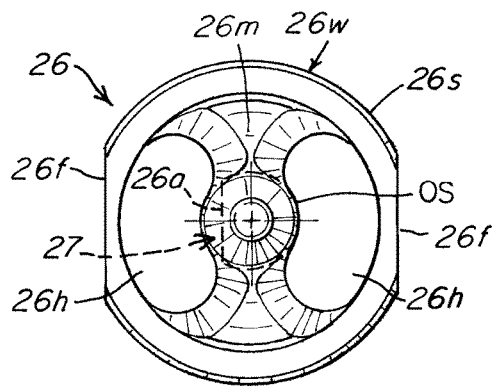
FIG. 9E is a top plan view of the FIG. 9A plug or insert.

FIGS. 1D, 1D, 2C, 2D, 3C, 3D, 4C, 4D, 5C, 5D, 6C, 6D, 7C, 7D, 8C, 8D, 9C, 9D all show an injection molding system 100 comprised of an injection molding machine 110 that injects fluid material 60 under pressure at high temperature through an inlet into an upstream end of a distribution flow channel to downstream distribution channel 40c disposed in a hotrunner or manifold 40 that routes the injection fluid to the bore or flow channel 200 of a nozzle 30 having a terminal downstream aperture or gate 70 that communicates with the cavity 80 of a mold 85 such that when the gate 70 is open injection fluid flows downstream into the cavity 80.

Preferably at least one actuator 55 is interconnected to the pins or rods 10, 12, 14, 16, 18, 20, 22, 24, 26, FIGS. 1A-9D so as to drive the pins or rods reciprocally upstream downstream UD around their axes A.

The linear actuator 55 typically includes a linear driver or piston that is controllably drivable in an upstream-downstream UD reciprocal manner along axis A that is in-line with the flow channel or bore 200 of the nozzle 30 is mounted in a stationary position relative to either a top clamp plate or the manifold. The linear actuator 55 can comprise a fluid driven device typically either hydraulic (such as oil) or pneumatic (such as air) driven where a piston is housed within the sealed bore of a cylinder and driven by controllable pumping of the fluid into and out of upstream and downstream drive chambers within the cylinder that houses the piston. The piston is prevented from rotating in the cylinder. And, as described below, the valve pin or rod 10, 12, 14, 16, 18, 20, 22, 24, 26 is preferably interconnected to the piston of the actuator 55 such that the valve pin or rod is non-rotatable or prevented from rotating. Thus rotation of the pin or rod 10, 12, 14, 16, 18, 20, 22, 24, 26 does not contribute to any disruption of the flow of injection fluid along the length L of the pin or rod during the course of an injection cycle.

Where the pin or rod 10, 12, 14, 16, 18, 20, 22, 24, 26 is driven by an actuator 55, the pin or rod moves or translates in unison axially A with axial movement of the piston and any rotary actuator that may be included. The distal tip end of the valve pin or rod is typically moved axially into and out of a closed gate position during the course of an injection cycle axial movement A of piston, actuator and its interconnected valve pin or rod.

Figure 10:
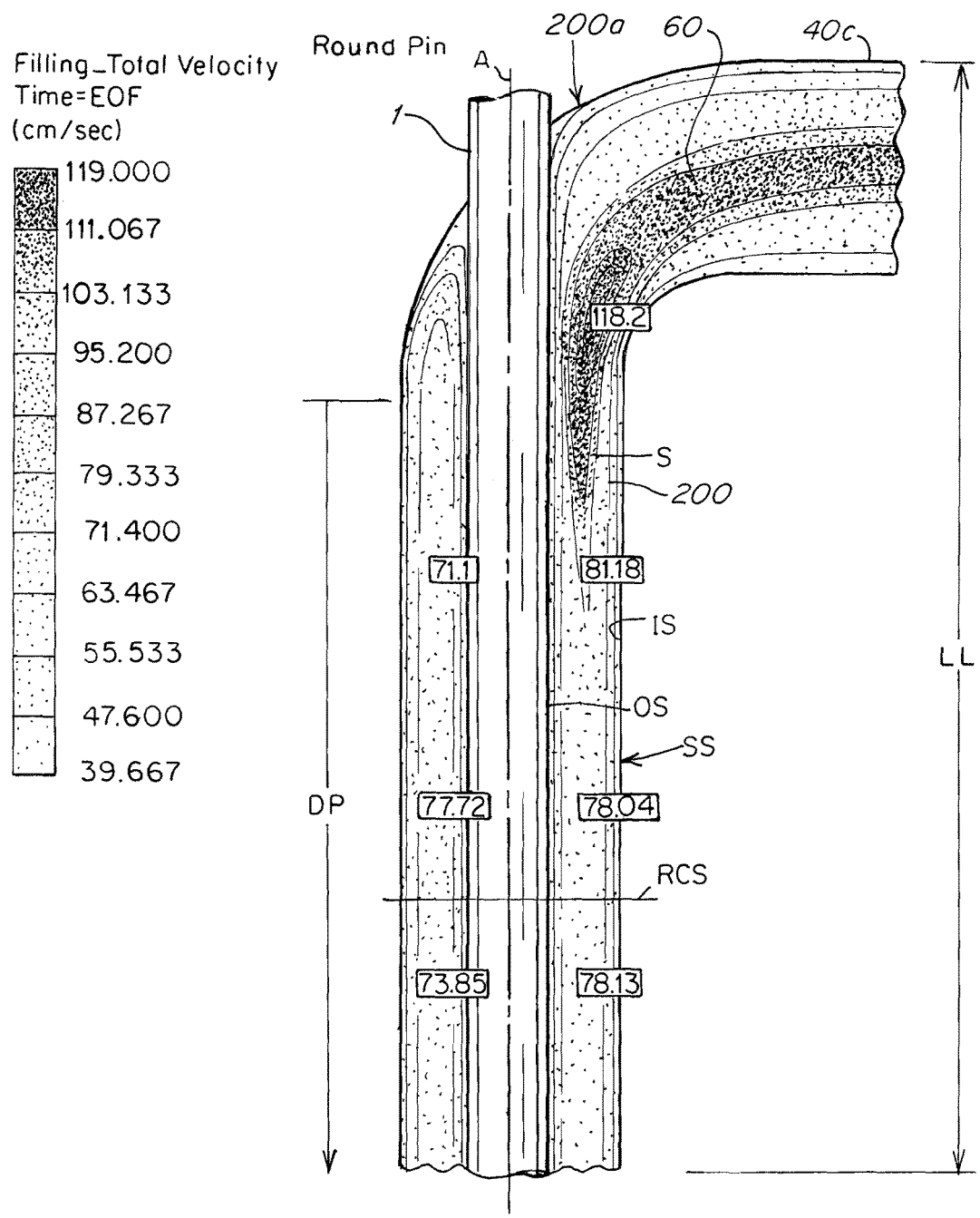
FIG. 10 is a side sectional view of a section of a heated manifold flow channel showing the pattern and velocity of flow of injection fluid through the upstream end of the curved and straight portions of a downstream fluid flow channel having a smooth cylindrical controllably driven rod or pin without any flow disruption discontinuous portions formed in the otherwise smooth outer circumferential surface, the rod or pin extending through a manifold channel section and further coaxially extending downstream through the straight section of the fluid flow channel of a nozzle.

The pins or rods 10, 12, 14, 16, 18, 20, 22, 24, 26 preferably have a maximum radial diameter PRD, FIGS. 1C, 1D, that is less than the minimum radial diameter CRD, FIG. 1D, of the fluid flow channel 200 in which the pin or rod is disposed such that a space S, FIG. 10, is disposed between the outer circumferential surface OS of the pin or rod and the interior circumferential surface IS of the flow channel 200 in which the pin or rod is disposed, the space S allowing injection fluid 60 to flow along the outer circumferential surface OS of the pin or rod from upstream toward downstream.

In all of the embodiments shown in FIGS. 1-15, the downstream flow channel 200 has an axial A channel length LL extending from an upstream end UE to a downstream end DE. The channel 200 has a curved or arcuate portion 200a that interconnects a manifold distribution channel 40c to the arcuate portion 200a of the channel 200 that terminates in at the gate 70 to the mold cavity 80. The channel 200 has an axially straight section SS that extends a downstream portion DP of the overall channel length LL. As described below with reference to FIGS. 10-13, the recesses, relieved portions, bores or discontinuities that are provided in the pins or rods are configured and arranged along the axial length L of a pin or rod such that the flow of injection fluid over or past the one or more discontinuous or relieved portions disposed in the straight section SS is modified to flow at substantially different rates or velocities or in substantially different flow patterns relative to rate or velocity or pattern of flow of injection fluid over or past the smooth continuous cylindrical outer suface (OS).

Each of the pins or rods 10, 12, 14, 16, 18, 20, 22, 24, 26 has an axial pin length L. Most preferably, the discontinuous or relieved portion (10a, 12a, 12b, 16a, 16b, 18a, 18b, 18c, 22a) of the rod or pin is disposed within the curved or arcuate portion (200a) of the fluid flow channel (200) over the course of at least a portion of the reciprocal upstream downstream (UD) path of travel of the valve pin.

FIGS. 1A, 1B, 1C, 1D show one embodiment of a pin 10 configuration having a recess, relieved portion, bore or discontinuity (or discontinuous portion) 11 in the form of a substantially flat surface 10a being formed into the otherwise smooth continuous outer cylindrically shaped surface OS of the pin or rod 10. As shown the recess 11 extends a relatively short distance SD along the axial length L of the pin 10.

FIGS. 1AA, 1EE show another embodiment of a pin 10 configuration having a recess, relieved portion, bore or discontinuity 11 in the form of a substantially concave surface 10aa being formed into the otherwise smooth continuous outer cylindrically shaped surface OS of the pin or rod 10. As shown the recess 11 extends a relatively short distance SD along the axial length L of the pin 10.

FIGS. 1AAA, 1EEE show another embodiment of a pin 10 configuration having a recess, relieved portion, bore or discontinuity 11 in the form of a substantially convex surface 10aaa being formed into the otherwise smooth continuous outer cylindrically shaped surface OS of the pin or rod 10. As shown the recess 11 extends a relatively short distance SD along the axial length L of the pin 10.

FIGS. 2A-2D show another embodiment of a pin 12 configuration having a relieved portion, discontinuous portion, discontinuity, recess or bore 13 in the form of a pair of flat surfaces 12a, 12b being formed into the otherwise smooth continuous outer cylindrically shaped surface OS of the pin or rod 12. As shown the recess 13 extends a relatively short distance SD along the axial length L of the pin 10.

FIGS. 3A-3D show another embodiment of a pin 14 configuration having a discontinuity 15 in the form of multiple dimples 14a being formed into the otherwise smooth continuous outer cylindrically shaped surface OS of the pin or rod 14. As shown the discontinuity 15 extends an extended relatively long distance ED, FIG. 3B, along the axial length L of the pin 14.

FIGS. 4A-4D show another embodiment of a pin 16 configuration having double recesses or bores or discontinuities 17 in the form of a pair of 180 degree opposing flat surfaces 16a, 16b being formed into the otherwise smooth continuous outer cylindrically shaped surface OS of the pin or rod 16. As shown the recesses 17 extend a relatively extended distance ED along the axial length L of the pin 16.

FIGS. 5A-5D show another embodiment of a pin 18 configuration having a series of sequentially disposed recesses or bores or discontinuities 19 in the form of flat surfaces 18a, 18b being formed on 180 degree radially opposing sides into the otherwise smooth continuous outer cylindrically shaped surface OS of the pin or rod 10. As shown the recesses 19 extend a relatively short distance SD in axially sequential locations along the axial length L of the pin 18.

FIGS. 6A-6D show another embodiment of a pin 20 configuration having multiple recesses or bores or discontinuities 21 formed sequentially along the axial length of the pin 20 in the form of radially reduced in diameter cylindrical necks or graduations 20a, 20b, 20c being formed into the otherwise smooth continuous outer cylindrically shaped surface OS of the pin or rod 20. As shown each of the successive recesses 21 extend a relatively short distance SD along the axial length L of the pin 10, the entire sequence extending an extended distance ED.

FIGS. 7A-7D show another embodiment of a pin 22 configuration having a relieved portion, discontinuous portion, discontinuity, recess or bore 23 in the form of a flat surface 22a being formed into the otherwise smooth continuous outer cylindrically shaped surface OS of the pin or rod 22. As shown the recess 11 extends an extended relatively long distance ED along the axial length L of the pin 22.

FIGS. 8A-D show another embodiment of a pin 24 configuration having a spiral relieved portion, discontinuous portion, discontinuity, recess or bore 25 in the form of a spirally shaped curved or curvilinear surface 24a being formed into the otherwise smooth continuous outer cylindrically shaped surface OS of the pin or rod 10. As shown the recess 25 extends an extended relatively long distance ED along the axial length L of the pin 24.

FIGS. 9A-9D show another embodiment of an insert or pin or rod 26 configuration having a relieved portion, discontinuous portion, discontinuity, recess or bore 27 in the form of a flat surface 26a being formed into the otherwise smooth continuous outer cylindrically shaped surface OS of the pin or rod 26. The insert or pin or rod 26 has a larger diameter head 26w with an outer circumferential surface 26s that mates with the interior circumferential surface IS of the nozzle channel 200, FIG. 9D so as to align the axis A of the rod or pin portion 26p of the insert 26 with the axis of the channel 200. In one embodiment, the head 26w can be provided with one or more flat surfaces 26f on the circumferential surface 26s that mate with a complementary flat surface 20sf, FIGS. 9BBB, 9BBBB, provided on the inside surface 20s of the channel 200 so that the pin 26p and the flat discontinuity 27 surface 26a is rotationally R fixed and does not rotate or is prevented from rotation around axis A.

FIG. 10 shows a flow pattern where the pin or rod 1 disposed within the channel 200 is completely cylindrical and has a completely and continuously smooth outer cylindrical surface OS along its entire axial length throughout the axial length LL of the flow channel 200. As shown by the gradations in color or darkness of the fluid in the channel 200 and space S between the outer surface OS of the pin 1 and inner surface IS of the nozzle 30, the flow of fluid 60 flowing from the upstream end to the downstream end undergoes a minimal amount of disturbance, disruption or turbulence over the path of flow.

Figure 11:
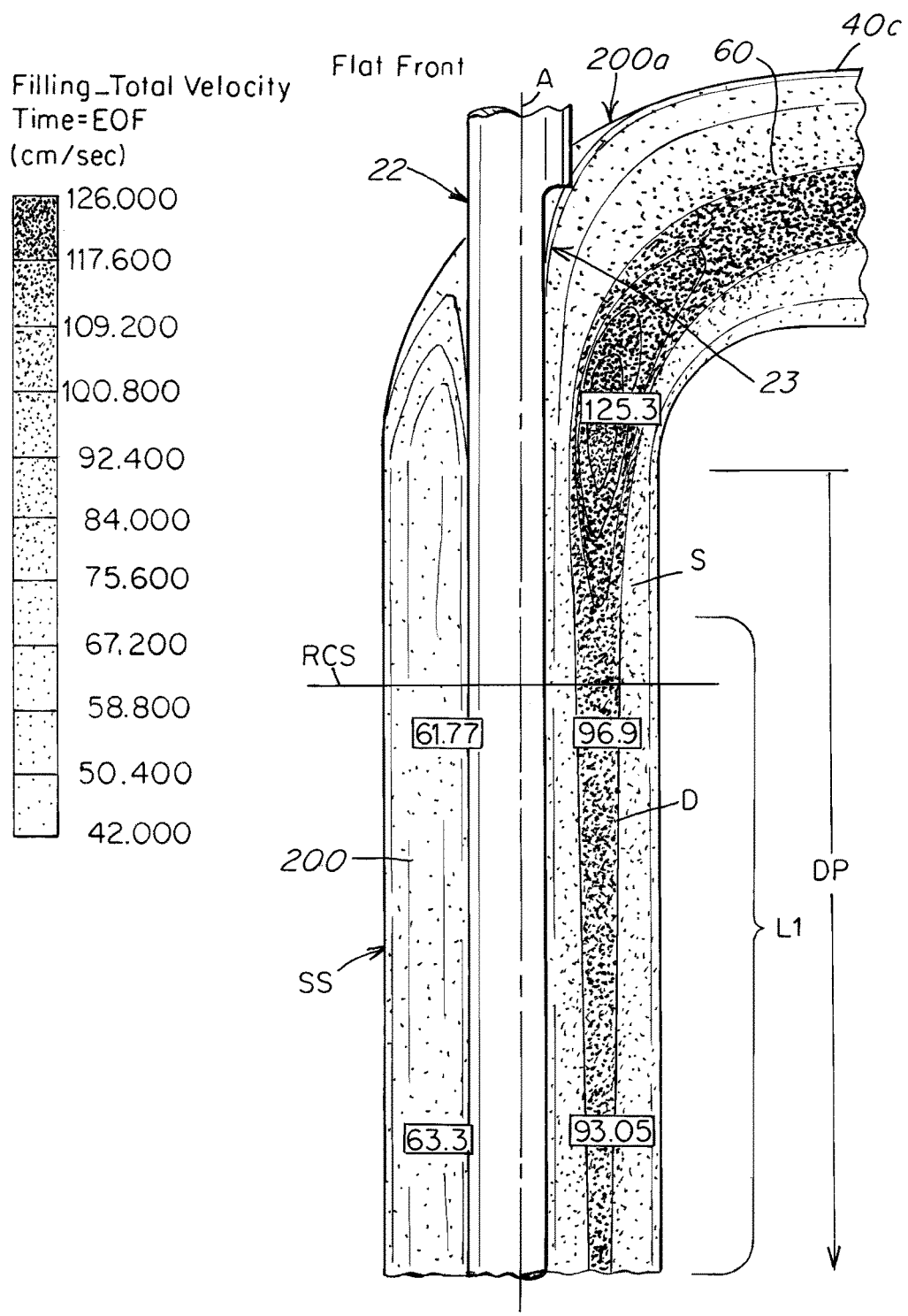
FIG. 11 is a side sectional view of a section of a heated manifold flow channel showing the pattern and velocity of flow of injection fluid through the upstream end of the curved and straight portions of a downstream fluid flow channel having a controllably driven rod or pin that has a flat surfaced discontinuity formed into the otherwise smooth outer circumferential surface (such as the discontinuity shown in FIGS. 7A-7D) the rod or pin extending through a manifold channel section and further coaxially extending downstream through the straight section of the fluid flow channel of a nozzle.
Figure 12:
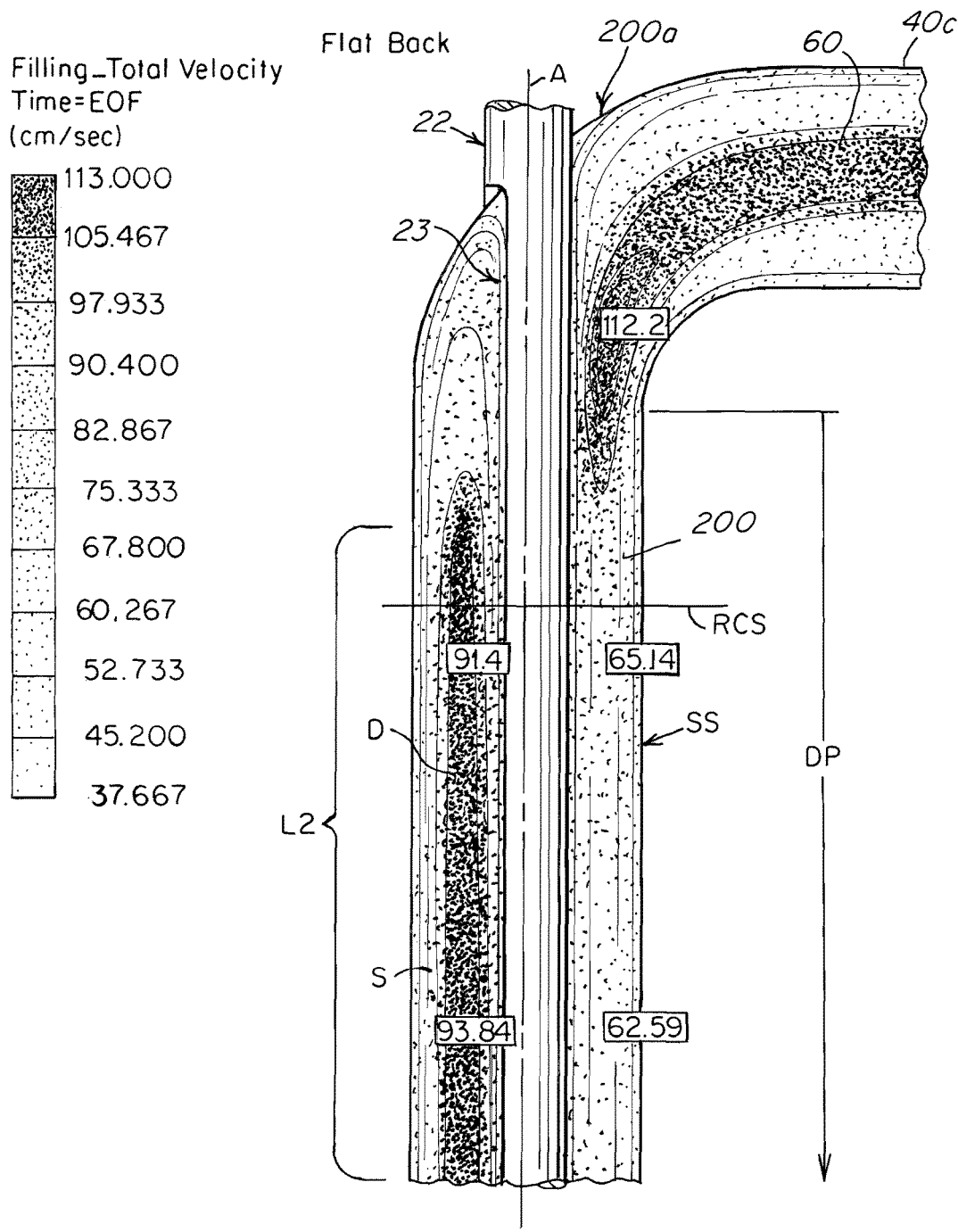
FIG. 12 is a side sectional view of a section of a heated manifold flow channel showing the pattern and velocity of flow of injection fluid through the upstream end of the curved and straight portions of a downstream fluid flow channel having a controllably driven rod or pin that has a flat surfaced discontinuity formed into the otherwise smooth outer circumferential surface (such as the discontinuity shown in FIGS. 7A-7D) the rod or pin extending through a manifold channel section and further coaxially extending downstream through the straight section of the fluid flow channel of a nozzle.
Figure 13:
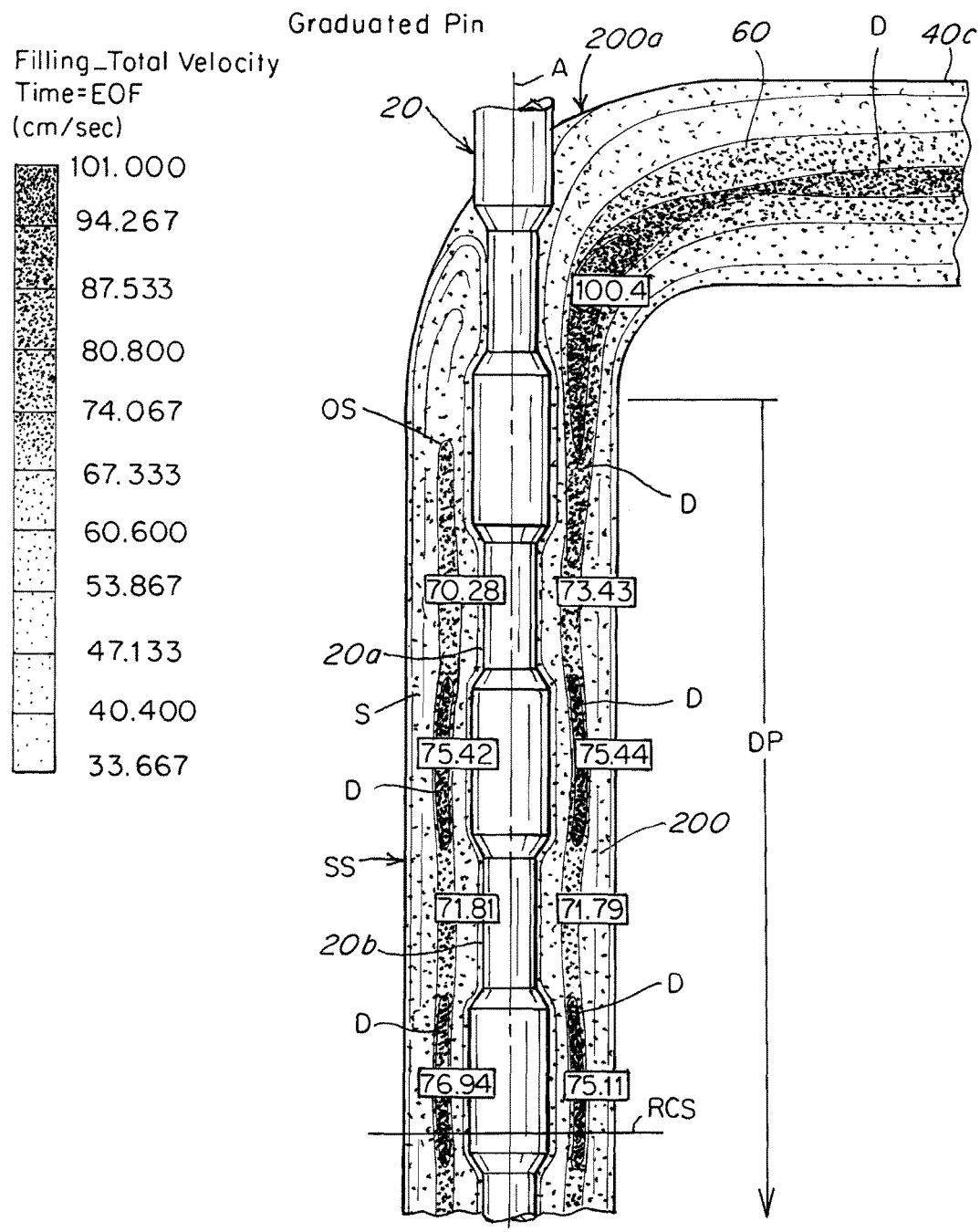
FIG. 13 is a side sectional view of a section of a heated manifold flow channel showing the pattern and velocity of flow of injection fluid through the upstream end of the curved and straight portions of a downstream fluid flow channel having a controllably driven rod or pin that has a sequential cylindrical groove discontinuities formed into the otherwise smooth outer circumferential surface (such as the discontinuities shown in FIGS. 6A-6D) the rod or pin extending through a manifold channel section and further coaxially extending downstream through the straight section of the fluid flow channel of a nozzle.

By contrast to the uniform flow pattern and velocities of the fluid flowing through the FIG. 10 system, FIGS. 11-13 illustrate the effect of the use of discontinuities 23, 20a to effect a disruption or variation in the flow patterns and flow velocities of injection fluid 60 that flows through the downstream length DP of the straight section SS of a flow channel 20 in an injection molding system 100 having a pin with a discontinuity such as shown in FIGS. 10, 1D, 2C, 2D, 3C, 3D, 4C, 4D, 5C, 5D, 6C, 6D, 7C, 7D, 8C, 8D, 9C, 9D. FIGS. 11-13 show examples where the discontinuity is a flat such as in FIG. 1A, 4A, 5A, 7A or a restricted throat such as in FIG. 6A. As shown by comparison of the flow pattern and velocities shown in FIG. 10, the discontinuities in the pins or rods shown in FIGS. 11-13 are configured and arranged along the axial length L of a pin or rod such that the flow of injection fluid through the straight section SS is modified to flow at substantially different rates or velocities or in substantially different flow patterns taken along a radial cross section RCS along essentially the entire length DP of the straight section SS.

In the FIG. 11 illustration, the pin 22 has a discontinuity or recess 23 as described above which as shown by the gradations in color or darkness of the fluid 60 in the channel 200 and space S results in a certain disruption or turbulence D in the flow of the fluid over the recess 23.

In the FIG. 12 illustration, the discontinuity or recess 23 in the pin 22 is oriented at 180 degrees relative to the orientation of the discontinuity in FIG. 11, thus resulting in a different pattern of disruption or turbulence D in the flow of fluid 60 over the recesses 23 through the space S and channel 200.

In the FIG. 13 illustration, the discontinuities 20a, 20b effect another different pattern of discontinuity or turbulence D in the flow of fluid 60 past and over the gradations 20a, 20b of the pin 20 as described above.

The pins or rods of the FIGS. 11-13 embodiments are non-rotatable or interconnected to the piston of the actuator 55 such that the pins or rods are prevented from rotating R around their longitudinal axes A within the flow channel 200. Even without rotation R of the pins or rods, the turbulence and variation in flow pattern and velocities as described above are achieved along the length DP of the straight section of the flow channel 200. The same turbulence and variation is achieved with each of the other pin or rod configurations having bores, recesses or discontinuities as described above where such pins or rods are interconnected so as to be prevented from rotating.

Figure 14:
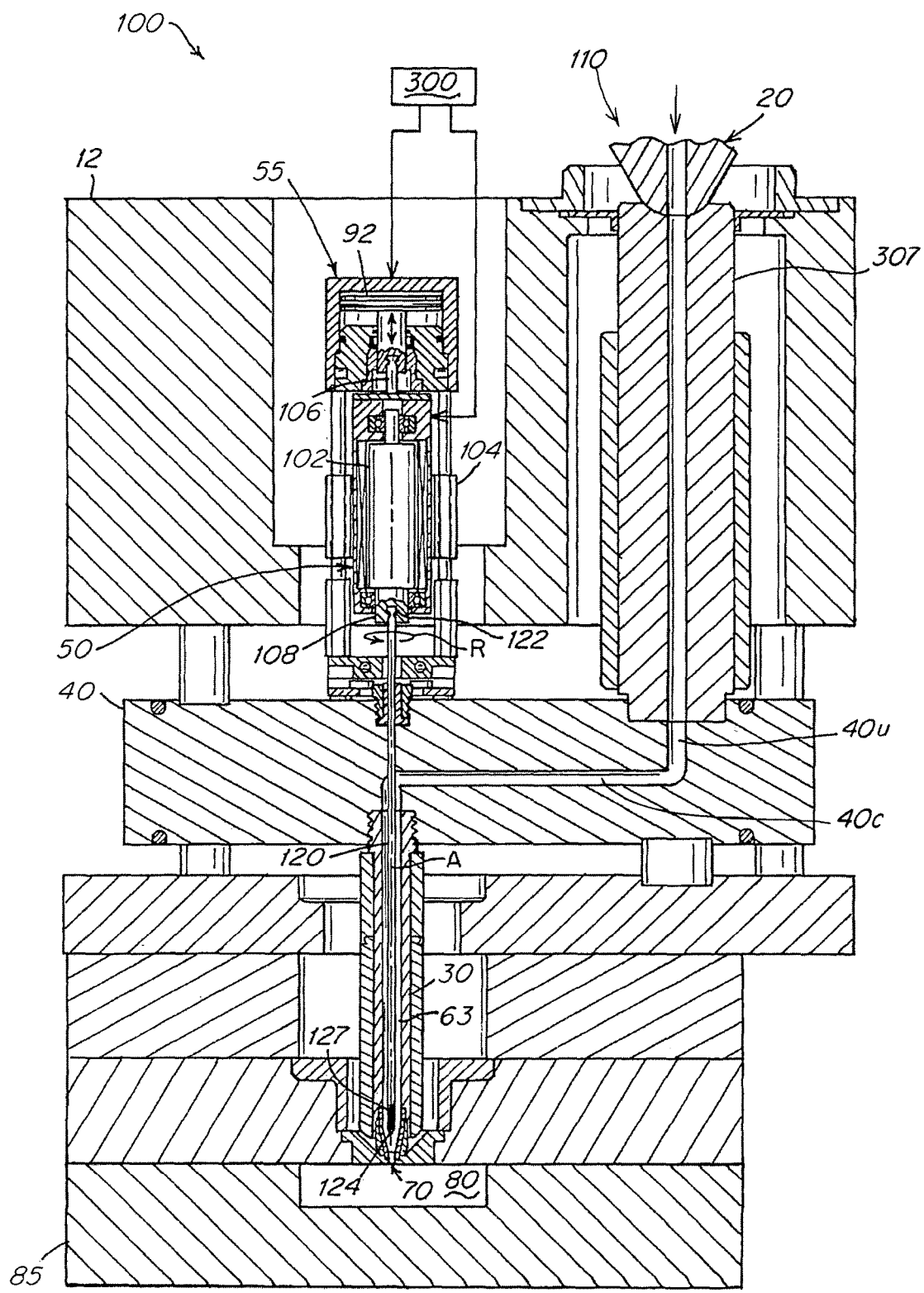
FIG. 14 is a schematic cross-sectional view of one embodiment of the invention showing a linear actuator assembled together with a rotary actuator such that the rotary actuator together with a valve pin attached to the rotor of the linear actuator both move translationally together with the piston of the actuator.

FIG. 14 shows an injection molding system 100 comprised of an injection molding machine 20 that injects fluid material under pressure at high temperature through an inlet 307 into a first downstream manifold channel 40u and further downstream through distribution flow channel 40c of a hotrunner or manifold 50 that routes the injection fluid to the bore or flow channel of a nozzle 60 having a terminal downstream aperture or gate 70 that communicates with the cavity 80 of a mold 82 such that when the gate 70 is open injection fluid flows downstream into the cavity 80.

In an alternative embodiment the valve pin or rod 10, 12, 14, 16, 18, 20, 22, 24, 26 can be interconnected to both a linear actuator 55 and a rotatable drive actuator 50. The linear actuator 55 has a linear driver or piston 92 that is controllably drivable in an upstream-downstream reciprocal manner along an axis A that is in-line with the flow channel or bore of the nozzle 60 is mounted in a stationary position relative to either a top clamp plate 12 or the manifold 40. In the embodiment shown in FIGS. 14, 15, the linear actuator 55 typically comprises a fluid driven device typically either hydraulic (such as oil) or pneumatic (such as air) driven where a piston 92 is housed within the sealed bore of a cylinder and driven by controllable pumping of the fluid into and out of upstream and downstream drive chambers within the cylinder that houses the piston. The piston is prevented from rotating in the cylinder by guide rod 96 and bore 98. The housing or support 104 of a second rotary actuator 50 is mounted to the linear driver or piston 92 via a connector 106 such that the rotary actuator 50 is movable in the axial direction A in unison with movement of the piston 92. The housing is mounted on sleeves 110 and slides along guide rods 112. The rotary actuator 50 includes a central controllably rotatable rotor 102 that is controllably rotatable R around the axis A of the path of linear travel of the piston 92.

In such an alternative embodiment, the valve pin 120 is connected to the rotor 102 via a head 122 such that the valve pin 120 moves or translates in unison axially A with axial movement of the piston 92 and rotary actuator 100. The distal tip end 124 of the valve pin 120 is moved axially into and out of a closed gate position during the course of an injection cycle axial movement A of piston 92, actuator 50 and its interconnected valve pin 120 which can have a configuration such as described above for pins 10, 12, 14, 16, 18, 20, 22, 24. The head 122 of the valve pin 120 is connected to the rotor 102 in a manner such that the pin 120 is secure against rotation relative to the rotor 102 itself and at the same time fixedly connected to the rotor 102 whereby the pin 120 rotates R in unison with rotation R of the rotor 102.

Figure 15:
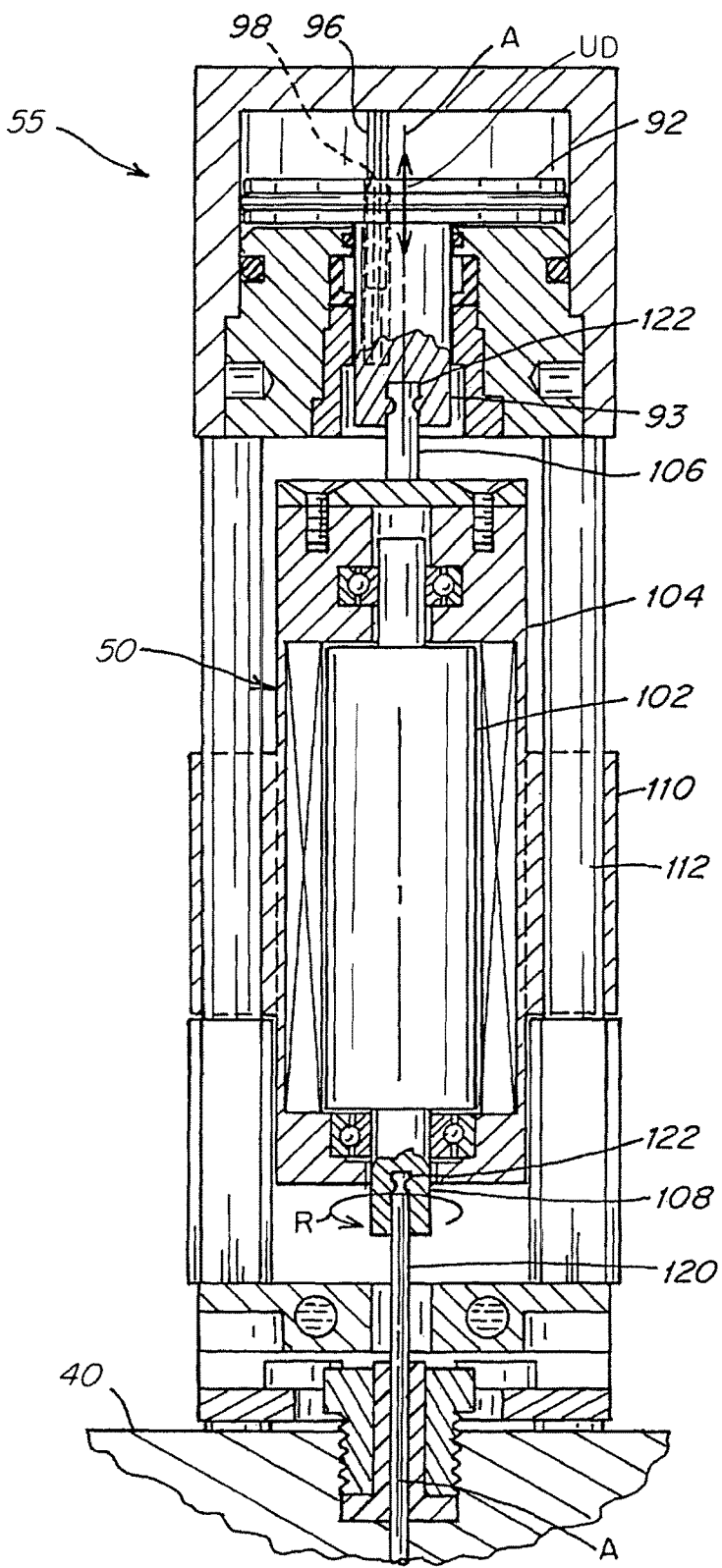
FIG. 15 is an enlarged detail view of a portion of FIG. 14 showing in greater detail the mounting of the rotary actuator to the piston of the linear actuator.

In such an embodiment, FIGS. 14, 15, the pin 120 is adapted not to rotate relative to rotor 102 of FIGS. 14, 15 and will only rotate together with rotation of the rotor 102 itself. As shown, the head 122 of the pin 120 can be provided with a pair of cylindrical grooves that slide into a complementary receiving aperture that is formed within the body of the downstream end 93 of piston 92 or in the body of a connector portion 108 of rotor 102 of the FIGS. 14, 15 embodiment. The receiving aperture has complementary cylindrically shaped protrusions that when mated within the cylindrically shaped grooves of pin 120 prevent pin 120 from rotating relative to rotor 102 or piston 92. The receiving aperture is typically formed by two bores connected by a slot with flat sides with protrusions formed on them. This allows an actuator to be easily disconnected from a valve pin by sliding the actuator sideways after removal of only four (4) connecting bolts.

What is claimed is:

1. An injection molding apparatus comprising:
   a manifold, having a fluid flow channel that receives injection fluid from an injection molding machine at one end for delivery to a gate of a mold cavity at the opposing end, the fluid flow channel including an axial straight channel section (SS) having a cylindrical bore aligned with a channel axis A and having a channel diameter (CRD), and
   an actuator, interconnected to a rod, for driving the rod axially upstream and downstream in the axial straight channel section (SS), the rod being mounted such that it is prevented from rotating around the axis (A) and wherein a distal tip end of the rod opens and closes the gate,
   the rod having a rod axial portion that is:
   a) disposed in the axial straight channel section (SS),
   b) axially aligned with the channel axis A;
   c) having a rod outer cylindrical shaped surface (OS) of a radial diameter (PRD) that is less than the channel diameter (CRD),
   d) having a first radial perimeter portion having a plurality of radially spaced apart recessed surfaces disposed around the first radial perimeter portion of the rod axial portion and at different radial locations around the circumference of the first radial perimeter portion, each of the radially spaced apart recessed surfaces being less than the full radial circumference and having an axial length aligned with the channel axis A, and recessed radially inwardly at a radial depth from the rod PRD to form a radial space between each radially recessed surface and the bore of the axial straight channel section (SS),
   e) and having a second radial perimeter portion without such radially recessed surfaces, wherein said radial space causes a radial disruption or turbulence (D) in the flow of injection fluid through the axial straight channel section taken along the radial cross section (CRD).

2. An injection molding apparatus according to claim 1 wherein the one or more radially recessed surfaces are generally flat or planar concaved.

3. The apparatus of claim 1 wherein the fluid flow channel (200) includes a curved or arcuate portion (200a) communicating flow of the injection fluid (60) to the straight channel section (SS), and
   one or more of the radially recessed surfaces of the rod being disposed within the curved or arcuate portion (200a) of the fluid flow channel (200) over the course of at least a portion of a reciprocal upstream downstream (UD) path of travel of the rod.

4. The apparatus of claim 1 wherein one or more of the radially recessed surfaces have two or more generally flat, planar, concave or convex surfaces disposed at a non-planar angle relative to each other.

5. The apparatus of claim 1 wherein two or more successive radially recessed surfaces each have a generally flat, planar, concave or convex surface disposed at a non-planar angle relative to each other.

6. A method of injecting fluid into the mold cavity (80) comprising injecting the injection fluid (60) into the fluid flow channel (200) of an apparatus according to claim 1 and controllably operating the actuator (55) to enable the injection fluid (60) to be injected into the mold cavity (80).

* * * * *